United States Patent
Jones et al.

(10) Patent No.: US 7,295,324 B2
(45) Date of Patent: Nov. 13, 2007

(54) SYSTEM AND METHOD FOR IMPROVING ACCURACY IN A SPECKLE-BASED IMAGE CORRELATION DISPLACEMENT SENSOR

(75) Inventors: Benjamin K. Jones, Seattle, WA (US); Michael M. Nahum, Kirkland, WA (US); Joseph D. Tobiason, Woodinville, WA (US); Karl G. Masreliez, Banyuls sur Mer (FR)

(73) Assignee: Mitutoyo Corporation, Kawasaki-shi (JP)

( * ) Notice: Subject to any disclaimer, the term of this patent is extended or adjusted under 35 U.S.C. 154(b) by 199 days.

(21) Appl. No.: 10/890,919

(22) Filed: Jul. 13, 2004

(65) Prior Publication Data

US 2006/0012798 A1    Jan. 19, 2006

(51) Int. Cl.
*G01B 9/02* (2006.01)
(52) U.S. Cl. ...................................................... 356/498
(58) Field of Classification Search ................ 356/512, 356/486, 493, 496, 498
See application file for complete search history.

(56) References Cited

U.S. PATENT DOCUMENTS

| | | | |
|---|---|---|---|
| 4,631,728 A | 12/1986 | Simons | |
| 4,794,384 A | 12/1988 | Jackson | |
| 4,913,547 A * | 4/1990 | Moran | ........................ 356/489 |
| 4,967,093 A | 10/1990 | Takemori | |
| 6,323,949 B1 * | 11/2001 | Lading et al. | ............. 356/28.5 |
| 6,642,506 B1 | 11/2003 | Nahum et al. | |
| 6,654,125 B2 * | 11/2003 | Maynard et al. | ............ 356/451 |
| 6,741,335 B2 * | 5/2004 | Kinrot et al. | .................. 356/28 |
| 2002/0179819 A1 | 12/2002 | Nahum | |
| 2003/0026457 A1 | 2/2003 | Nahum | |
| 2003/0026458 A1 | 2/2003 | Nahum | |
| 2003/0090681 A1 | 5/2003 | Jones et al. | |
| 2004/0076198 A1 * | 4/2004 | Spoonhower et al. | ......... 372/20 |
| 2005/0243055 A1 * | 11/2005 | Ranta et al. | ................. 345/156 |

FOREIGN PATENT DOCUMENTS

| | | | |
|---|---|---|---|
| JP | 5-52517 A | | 3/1993 |
| JP | 8271231 | | 10/1996 |
| SU | 1241062 A | * | 6/1986 |

* cited by examiner

*Primary Examiner*—Samuel A. Turner
(74) *Attorney, Agent, or Firm*—Christensen O'Connor Johnson Kindness PLLC

(57) ABSTRACT

A system and method for improving the accuracy of a speckle-based image correlation displacement sensor provides ultra-high accuracy by ensuring that, in the absence of motion, the speckle image does not vary over time. In one embodiment, the speckle image is stabilized by reducing or compensating for laser diode wavelength changes. Various methods for stabilizing the wavelength include thermoelectric temperature control, measuring and correcting the wavelength by any suitable means, or providing a specific wavelength of light feedback from an external grating. Image stabilization may also be accomplished by monitoring the warm-up process of the system. Once the system is determined to have completed the warm-up process, an indicator is provided to the user to indicate that the system is ready for use. Sensor geometric configurations that reduce or eliminate wavelength-related errors are also disclosed.

27 Claims, 22 Drawing Sheets

US 7,295,324 B2

SYSTEM AND METHOD FOR IMPROVING ACCURACY IN A SPECKLE-BASED IMAGE CORRELATION DISPLACEMENT SENSOR

FIELD OF THE INVENTION

This invention is related to displacement sensors, and more particularly to speckle-based image correlation displacement sensors.

BACKGROUND OF THE INVENTION

Various known devices use speckle images and correlation between speckle images to determine deformations and/or displacements. A speckle image is generated by illuminating an optically rough surface with a light source. Generally, the light source is a coherent light source, and more particularly, is a laser-generating light source, such as a laser, a laser diode, and the like. After the optically rough surface is illuminated by the light source, the light scattered from the optically rough surface is imaged onto an optical sensor, such as a charge-coupled device (CCD), a semiconductor image sensor array, such as a CMOS image sensor array, or the like.

Prior to displacement or deformation of the optically rough surface, a first speckle image is captured and stored. Subsequently, after deformation or displacement of the optically rough surface, a second speckle image is captured and stored. The previous and subsequent speckle images are then compared on a pixel by pixel basis. In particular, a plurality of comparisons are performed. In each comparison, the previous and subsequent speckle images are offset relative to each other, and the amount of offset is increased by one image element, or pixel, between each comparison. In each comparison, the image value of a particular pixel in the previous image is multiplied by, or subtracted from, the corresponding subsequent image pixel (based on the amount of offset) and the result is accumulated for all pixels to determine a correlation value. The offset having the best correlation value between the subsequent and previous images will generate a peak or a trough when the set of correlation values is plotted against the offset.

For example, U.S. Pat. No. 4,794,384 discloses a mouse which uses speckle-image-correlation to determine two dimensional motion directions of a mouse. However, in the '384 patent, the speckle-image-correlation does not need to be performed at a high rate and the accuracy only needs to be on the millimeter range.

U.S. Pat. No. 4,967,093 discloses systems and methods for measuring deformation of an object using speckle-image-correlation. In particular, the '093 patent describes in detail various conventional methods for comparing two speckle images and for determining when to update a current reference speckle image with a new reference speckle image. Similarly, published Japanese Patent Application 8-271231, published October 1996, discloses additional methods for avoiding accumulating error in a speckle-image-based displacement gauge.

Japanese Patent Application No. 5-52517, published March 1993, discloses a speckled-image-based displacement meter that uses a rectangular or elliptically shaped slit 51 in a slit plate 5. The light beam from the laser light source passes through the slit 51 before it illuminates the optically rough surface. Thus, the light beam is shaped by the slit 51. The shaped light beam allows an amount of displacement in a main displacement direction to be measured with high sensitivity while displacement components in a perpendicular direction relative to the main displacement direction tends not to affect the measurement.

SUMMARY OF THE INVENTION

A system and method for improving the accuracy of a speckle-based image correlation displacement sensor is provided. The systems and methods disclosed herein are particularly useful for reducing or eliminating previously ignored or unrecognized speckle-based image correlation displacement sensor errors that become significant when the system measurement resolution and accuracy reach sub-micron levels. The systems and methods disclosed herein are particularly useful for providing meaningful measurement resolution and/or accuracy on the order of 100 nanometers, 10 nanometers, and even 1 nanometer or less in various speckle-based image correlation displacement sensing systems.

In accordance with one aspect of the invention, the speckle intensity pattern is stabilized so as to reduce the modulation of individual speckles within the intensity pattern due to causes other than displacement, so as to avoid the correlation function peak value converging toward the correlation function noise value arising from image randomness. In other words, the system is made to have high accuracy by ensuring that, in the absence of motion, the speckle image does not significantly vary over time. This is important because speckle-based image correlation displacement sensors operate by computing the correlation between a reference image (stored in memory) and a current image. The displacement is determined by using interpolation to find the peak of the correlation value curve with sub-pixel accuracy, and in order for the highest accuracy to be obtainable, the image must be stable except for the desired displacement-induced effects. More specifically, for certain sources and/or types of image instability discussed below, the modulation phase for the different speckles within the image tends to be random. In other words, the whole image does not modulate in intensity, but rather, various parts of the image (i.e., individual speckles) modulate with random phase relation to other parts. The effect of this type of instability is to lower the correlation function peak value, that is, reduce the peak height, relative to the noise (not electronic noise, but the inherent correlation function noise arising from the image randomness which produces a nominal non-zero "background" correlation value at offset values away from the peak (or trough) of the correlation curve.) This, in turn, essentially reduces the signal to noise (S/N) ratio of the correlation "signal" and will cause a reduction in the system accuracy and repeatability. Thus, by reducing or eliminating this type of image instability, the accuracy and repeatability of the system can be improved.

In accordance with another aspect of the invention, the speckle image is stabilized by reducing or compensating for wavelength changes in the coherent light source of the displacement sensor system. The term "light" as used herein means any operable visible or invisible wavelength of radiation. In one embodiment, the coherent light source is a laser diode. Wavelength changes tend to cause image "drift" or speckle spatial phase modulation, thus, accordingly, reducing or compensating for the wavelength changes stabilizes the image.

In accordance with another aspect of the invention, the speckle images and the resulting measurement accuracy are stabilized against wavelength changes by locating the speckle producing surface close to, or coinciding with, the focal plane of the optical system of the optical displacement sensor.

In accordance with another aspect of the invention, with respect to at least one measuring axis direction, the speckle images and the resulting measurement accuracy are stabilized against wavelength changes by illuminating the speckle producing surface along a direction that forms an angle of at least 70 degrees with the at least one measuring axis direction.

In accordance with a further aspect of the invention, the speckle images and the resulting measurement accuracy are stabilized against wavelength changes by illuminating the speckle producing surface along a direction that is orthogonal to the at least one measuring axis direction.

In accordance with a further aspect of the invention, the speckle images and the resulting measurement accuracy are stabilized against wavelength changes by illuminating the speckle producing surface along a direction that is normal to the speckle producing surface.

In accordance with another aspect of the invention, a thermoelectric cooler may be utilized to stabilize the temperature and thus the wavelength of the coherent light source. The temperature variations in the coherent light source may in some cases be caused either during turn on and warm-up of the system or by ambient temperature variations after the system has reached a steady state. Thus, by utilizing a thermoelectric cooler to stabilize the temperature of the coherent light source, the wavelength drift can be reduced.

In accordance with another aspect of the invention, the wavelength of the coherent light source may be stabilized through measuring the wavelength and providing feedback. In other words, once the wavelength is measured and an error signal arising from comparing the wavelength to a desired wavelength is fed back to the coherent light source system, the wavelength can be controlled by changing either the temperature or the current in accordance with the error signal feedback. In one embodiment, the changing of the temperature may be preferred over the changing of the current, which may also cause undesired changes to the power.

In accordance with another aspect of the invention, the coherent light source power and/or illumination intensity is stabilized.

In accordance with another aspect of the invention, the wavelength may be stabilized through use of optical feedback from an external grating. The grating may be positioned at an angle relative to an emitted light beam, and a fraction of the wavelength incident on the grating may be fed back to the coherent light source system. The grating feeds back a well defined wavelength determined by the grating pitch and grating angle in order to stabilize the laser at that wavelength.

In accordance with another aspect of the invention, an indicator may be provided to indicate when the system is stable and ready for use. In other words, due to the fact that during the time the system is warming up the temperature change within the readhead (and of the coherent light source) is relatively large, an image instability results. Therefore an indication can be provided to signal when the warm-up process has approximately reached completion at steady state, thus inhibiting the use of potentially unstable images.

In accordance with another aspect of the invention, the warm-up process may be monitored by comparing images obtained over a specified time interval. In one embodiment, the process begins by holding the readhead at a fixed position and turning on the system. Then, a first image is captured, and after a time interval a second image is captured. The images are compared to determine the correlation and the process is repeated if necessary. When the correlation between successive images is sufficiently high and/or stable, then the system is determined to have completed the warm-up process, and an indicator or signal is provided to a user or a host system (e.g., a light on the readhead turns green, or a signal is output to the host system) to indicate that the system is stable and ready for use.

In accordance with another aspect of the invention, the speckle-based image correlation displacement sensor is designed and/or mounted such that an optical axis for imaging the speckles is nominally perpendicular to the surface that gives rise to the speckles and to a displacement measurement axis.

In accordance with another aspect of the invention, a stabilizing element of the speckle-based image correlation displacement sensor comprises a mounting position height monitoring system that provides a signal when a focal plane of the readhead is adequately close to the surface that gives rise to the speckles.

In accordance with a further aspect of the invention, when the mounting position height is iteratively altered the mounting position height monitoring system is operable to iteratively determine a displacement value between a reference image and a current image, the reference image and the current image obtained while holding fixed the displacement of the readhead relative to the surface along the measurement axis, and the mounting position height monitoring system determines when the focal plane of the readhead is adequately close to the surface based on one or more of the displacement values.

In accordance with another aspect of the invention, when the speckle-based image correlation displacement sensor is held at a fixed displacement position relative to a scale surface that gives rise to speckles, the readhead is operable to provide displacement values that do not vary by more than +/−50 nanometers relative to their average value, throughout at least a 12 hour operation period beginning no more that 1 hour after initial turn-on of the readhead.

BRIEF DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein.

DETAILED DESCRIPTION OF THE PREFERRED EMBODIMENT

Figure 1:
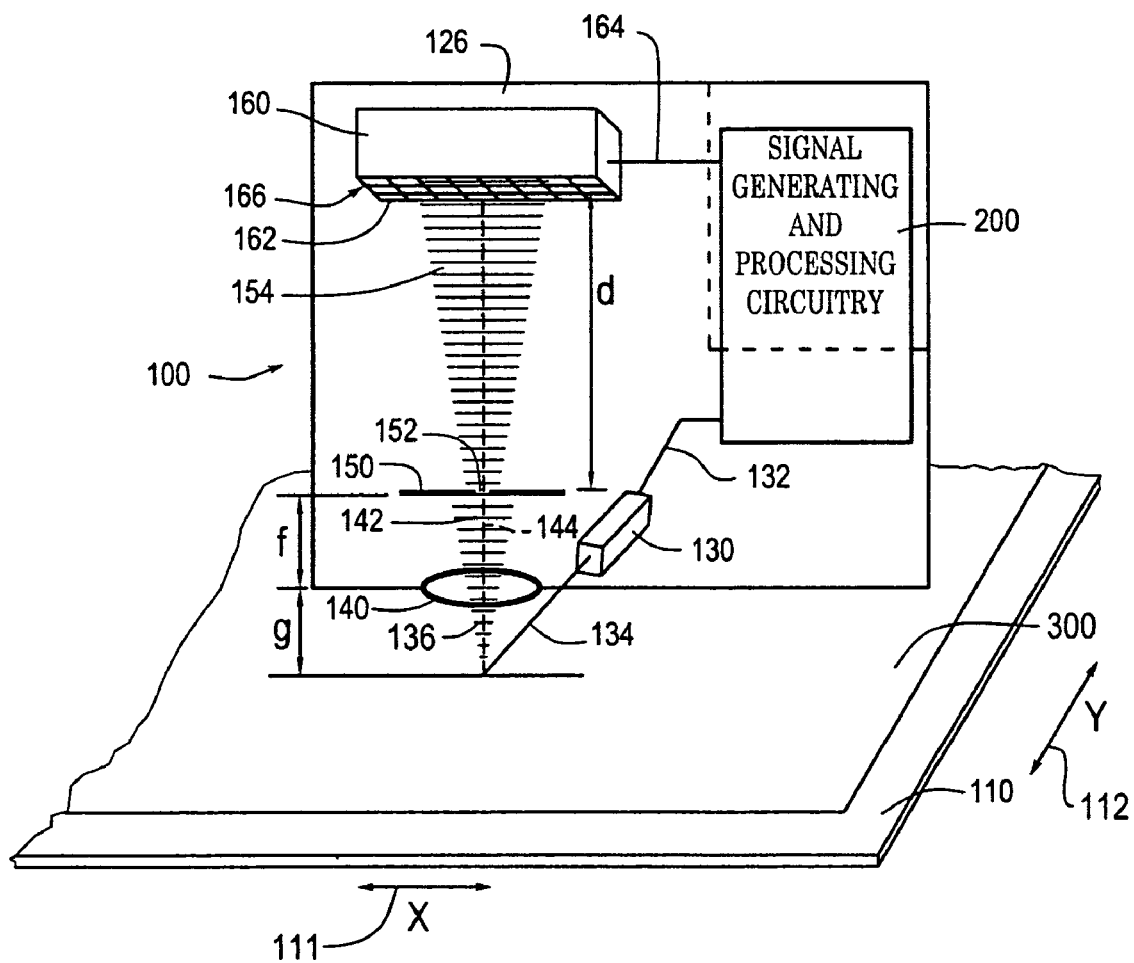
FIG. 1 is a block diagram of a speckle-image-correlation 2D optical position transducer according to this invention.

FIG. 1 is a schematic block diagram of a 2-dimensional (2D) optical displacement sensor 100 usable with an optically diffusing, or optically rough, surface according to this invention to generate a 2D displacement measurement. The 2D optical displacement sensor 100 shown in FIG. 1 includes a readhead 126, signal generating and processing circuitry 200 and a 2D scale 110. The 2D scale 110 includes an optically diffusing, or optically rough, surface 300, which may be integral with and/or indistinguishable from the scale 110, or an added or processed surface. In FIG. 1, the components of the readhead 126, and their relation to the 2D scale 110 and the surface 300, are shown schematically in a layout that generally corresponds to an exemplary physical configuration, as further described below.

Figure 3:
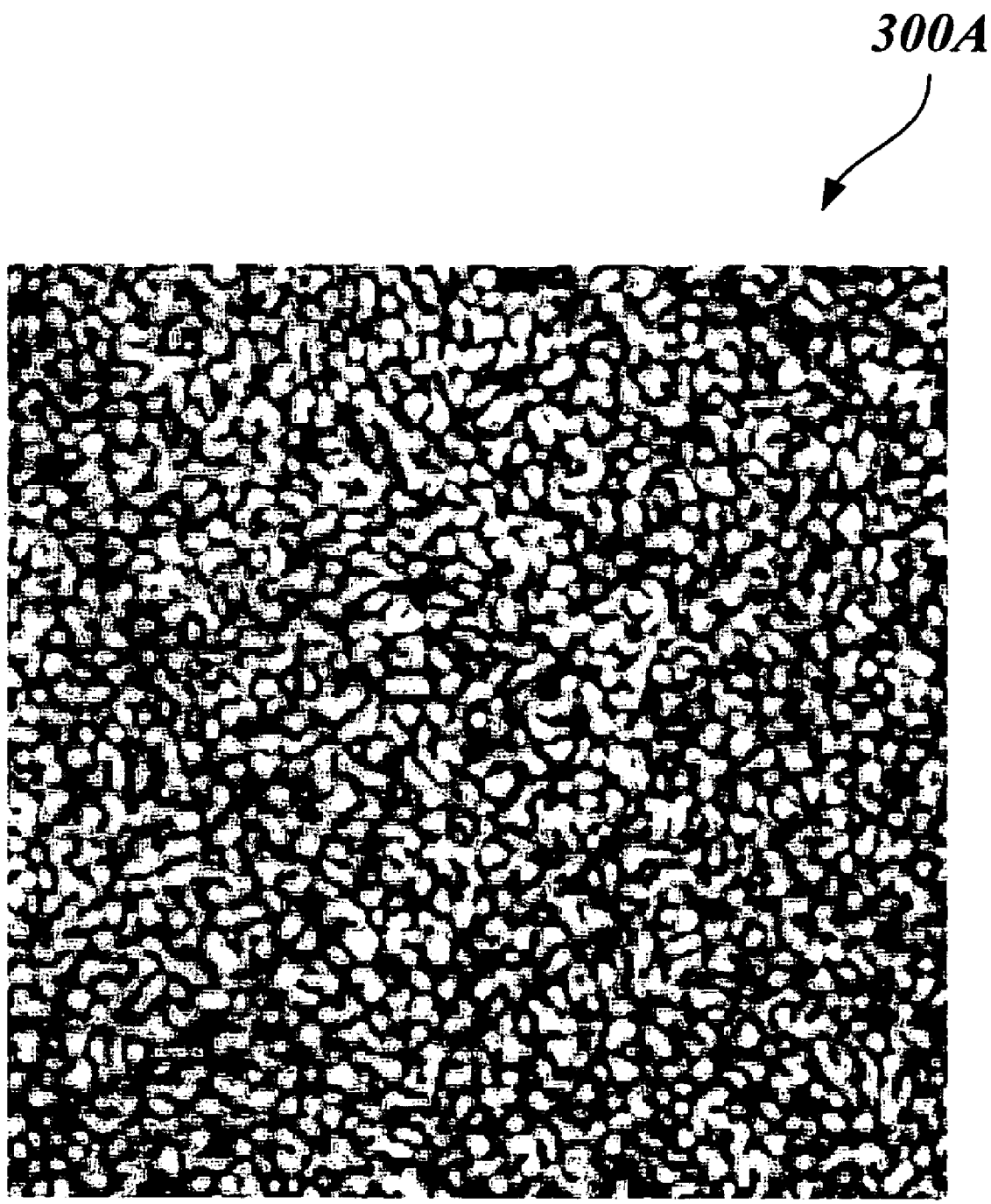
FIG. 3 illustrates a speckle pattern formed using the speckle-image-correlation optical position transducer according to this invention.

As described in more detail below with reference to FIG. 3, the optically diffusing, or optically rough surface 300 diffracts or otherwise scatters light used to illuminate the surface 300. Thus, when the surface 300 is illuminated and scatters light towards a light detecting device, such as a camera, an electronic or digital camera, a CCD array, an array of CMOS light sensitive elements or the like, the scattered light has regions where the optically diffusing, or optically rough, surface 300 causes the diffracted light waves to positively or negatively superimpose or interfere in the image plane of the light detecting device depending on their relative phase at each location on the image plane. As a result, as illustrated in FIG. 3 the image captured by the light detecting device will contain a pattern 300A of relatively bright spots, or speckles, where the diffracted light waves positively combined, and relatively dark spots where the diffracted light waves negatively combined.

The image captured by the light detecting device has an intensity pattern 300A that depends primarily on the portion of the surface 300 that scatters the light captured by the light detecting device and the characteristics of the optical path. In particular, the intensity pattern 300A generated by any particular illuminated portion of the surface 300 is a corresponding particular randomly-structured pattern that corresponds to the particular surface structure of that particular portion of the optically diffusing, or optically rough, surface 300. In particular, the optically diffusing, or optically rough, surface 300 does not need to be ruled or intentionally patterned with a predetermined or regular pattern. Thus, the particular intensity pattern corresponding to any particular illuminated portion of the surface 300 is not dependent on placing a predetermined or structured pattern on the surface 300. Rather the surface 300 need only have an operable optically diffusing, or optically rough surface property. Various design aspects and methods for the operation of such a system are described in more detail in U.S. Pat. No. 6,642,506, and in U.S. patent applications Ser. Nos. 09/921,889; 09/860,636; 09/987,162 and 09/921,711, all of which are hereby incorporated by reference in their entirety.

Returning to FIG. 1, the speckle readhead 126 includes a light source 130 that outputs light 134 towards the optically rough surface 300. Light scattered from this surface 300 gives rise to speckles. The scattered light is imaged onto an image detector, and the image is captured and stored. Subsequently, a second image is captured and stored. The two images are repeatedly compared by correlation at different offsets in a displacement direction. The comparison(s) having the highest correlation value(s) can be used to determine the amount of displacement between the readhead 126 and the surface 300 that occurred between taking the two images.

In operation, the surface 300 of the scale 110 is positioned adjacent to an illuminating and receiving end of the readhead 126, such that when the surface 300 is illuminated by light 134 emitted from that end of the readhead 126 by a light source 130, the emitted light 134 is reflected back by the illuminated displacement-dependent portion of the surface 300 towards the image receiving optical elements 162 positioned at that end of the readhead 126. The surface 300 of the 2D scale 110 is positioned at a generally stable distance from the light source 130 and an optical system housed in the readhead 126. The surface 300 of the 2D scale 110 moves relative to readhead 126 along two axes of relative motion, such as along a first measuring axis direction 111 and a second measuring axis direction 112, as shown in FIG. 1.

The relative motion in a third dimension orthogonal to the first and second measuring axes 111 and 112 is generally constrained, such as, for example, by conventional guideways or bearings (not shown) mounted to a frame, to maintain the proper relative distance or gap between the readhead 126 and the surface 300. The readhead 126 may include an alignment feature (not shown) which aids in mounting the readhead 126, and aligns the internal components of the readhead 126 relative to the mounting frame and/or the expected axes of relative motion 111 and 112.

As shown in FIG. 1, the optical system of the readhead 126 includes a lens 140 positioned at the illuminating and receiving end of the readhead assembly 106 such that an optical axis 144 of the lens 140 is generally aligned with the illuminated area of the surface 300. In the exemplary embodiment shown in FIG. 1, the readhead 126 further includes a pinhole aperture plate 150 including an aperture 152, spaced apart from the lens 140 along the optical axis 144 by a distance coinciding with the focal length f of the lens 140, and a light detector 160 having an array 166 of image receiving optical elements 162 spaced apart from the aperture plate 150 along an optical path, as shown schematically in FIG. 1. Such a telecentric arrangement makes the magnification of the optical system approximately independent of the object distance g from the lens 140 to the surface 300.

In various embodiments, if the object distance g is sufficiently well controlled, such as, for example, by accurate bearings or the like, the aperture plate 150 may be omitted. The light detector 160 can include any known or later-developed type of light sensitive material or device that can be organized into a 2D array of independent and individual light sensing elements, such as a camera, an electronic or digital camera, a CCD array, an array of CMOS light sensitive elements, or the like.

An exemplary spacing and positioning of the surface 300 of the 2D scale 110 and the readhead 126, including the lens 140, the aperture plate 150, and the imaging plane of the light detector 160, is further described below. The mounting of the light source 130, the lens 140, the aperture plate 150, and the light detector 160 in the housing of the readhead 126 may be done according to conventional methods of miniature optical system construction and/or industrial camera construction, provided that the components are mounted in a relatively precise and stable manner. When the readhead 126 is suitably positioned adjacent to the surface 300 of the scale 110, each image captured by the light detector 160 will contain a particular speckle image arising from a corresponding particular 2D portion of the surface 300.

In addition, the readhead 126 includes at least a portion of the signal generating and processing circuitry 200. As shown in FIG. 1, a signal line 132 from the signal generating and processing circuitry 200 is connected to the light source 130, to control and/or drive the light source 130. A signal line 164 connects the light detector 160 and the signal generating and processing circuitry 200. In particular, each of the image elements 162 of the array 166 can be individually addressed to output a value representing the light intensity on that image element 162 over the signal line 164 to the signal generating and processing circuitry 200. Additional portions of the signal generating and processing circuitry 200 may be placed remotely from the readhead 126, and the functions of the readhead 126 can be operated and displayed remotely.

As shown in FIG. 1, a light beam 134 is emitted by the light source 130 and is directed to illuminate a portion of the surface 300. As a result, the illuminated portion of the surface 300 reflects the operable light 136 about the optical axis 144, the particular structure of the light 136 depending on the particular structure of the illuminate portion of the surface 300.

Figure 2B:
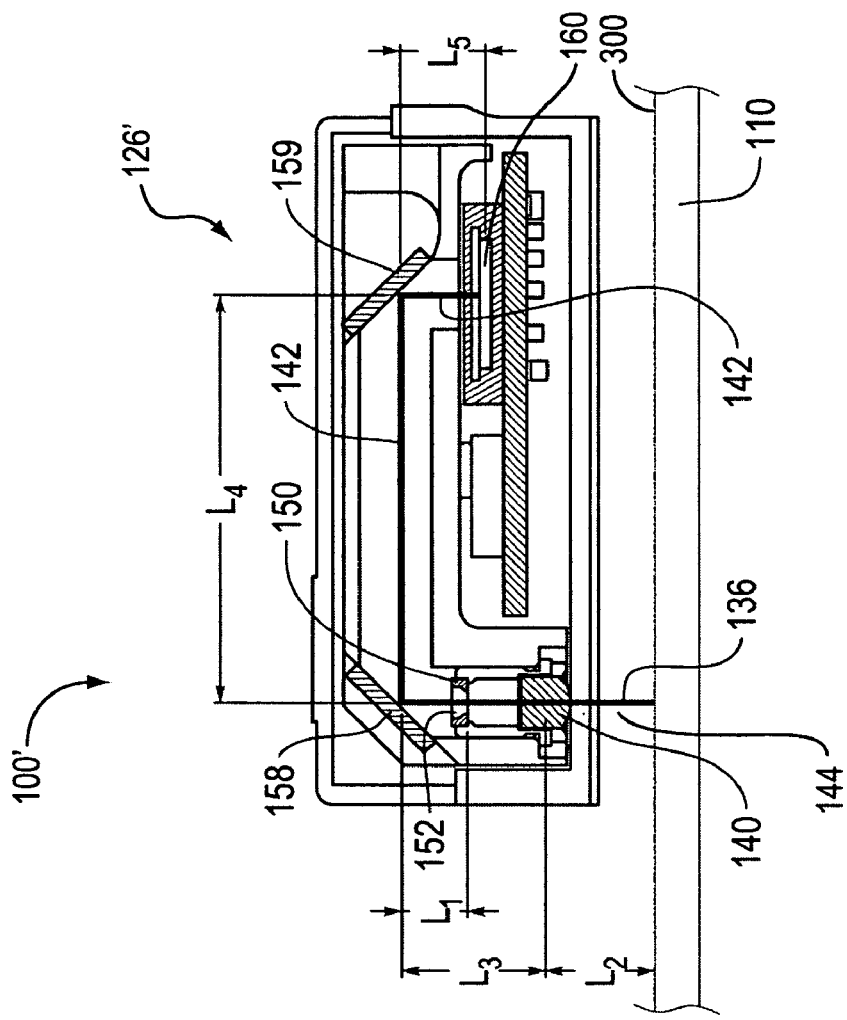
FIGS. 2A and 2B are end and side views, respectively, of one embodiment of the 2D optical position transducer shown in FIG. 1.
Figure 2A:
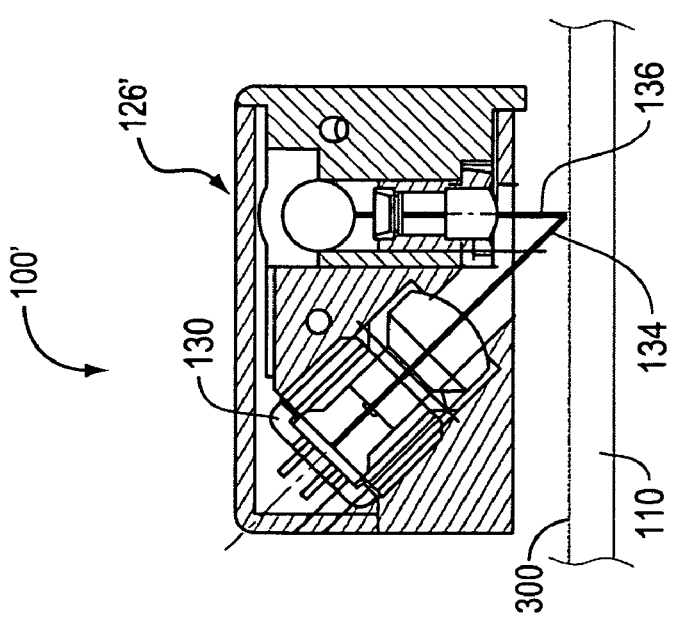

FIGS. 2A and 2B are end and side views, respectively, of an optical displacement sensor 100', which is one exemplary embodiment of the 2D optical displacement sensor 100 shown in FIG. 1. As shown in FIGS. 2A and 2B, in a readhead 126', the light source 130 is a laser diode. A beam 134 from the light source 130 is reflected by the surface 300. The operable reflected beam 136 passes along the optical axis 144 and through the lens 140 and is projected as light 142 to an aperture 152 in the pinhole aperture plate 150 to reach a first mirror 158. The beam of light 142 is reflected by the first mirror 158 to a second mirror 159. The beam of light 142 is further reflected by the second mirror 159 onto the imaging surface of the detector 160. It should be appreciated that only the central axes of the beam 134, the reflected beam 136 and the beam of light 142 are shown in FIGS. 2A and 2B. In general the beam 134 and 136 will have a beam diameter larger than the aperture 152, so that the aperture 152 is the limiting aperture of the optical system.

In various exemplary embodiments, the beam 134 and the optical axis of the operable light beam 136 are at an angle of very roughly 45° relative to each other in a plane perpendicular to the surface 300. In particular, the optical axis of the optical system of the readhead 126' is normal to the plane defined by the surface 300 in various exemplary embodiments. The first and second mirrors 158 and 159 each change the direction of the beam 136 by 90°. In various exemplary embodiments, the distance L2 between the surface 300 and the effective plane of the lens 140 is about 5.5 mm. The distance L3 between the lens 140 and the aperture 152 is about 4.5 mm. The distance L1 between the first mirror 158 and the aperture 152 is about 4.1 mm. The distance L4 between the first and the second mirrors 158 and 159 is about 23.7 mm. The distance L5 between the second mirror 159 and the detector 160 is about 5.3 mm. However, in general, certain aspects of this invention are usable with readheads using other angles for the illumination, the optical axis, the mirror angles and the various dimensions.

FIG. 3 illustrates a speckle pattern 300A formed using the speckle-image-correlation optical displacement sensor according to this invention. As described above, an image such as the speckle pattern 300A is formed when coherent light illuminates the surface 300. Thus, the image captured by a light detecting device located adjacent to the surface 300 will contain an image such as the speckle pattern 300A. After a first, or reference, speckle pattern image is captured and stored, a second, or subsequent, speckle pattern image is captured and stored. The two images are repeatedly compared by correlation at different offsets along one or two displacement directions, depending on the number of relative displacement axes or dimensions that are used in an application. The comparison having the highest correlation value indicates the displacement between the readhead 126 and the surface 300 that occurred between taking the two images. As noted above, this process is described in more detail in the incorporated '506 patent and in other incorporated references.

Figure 4:
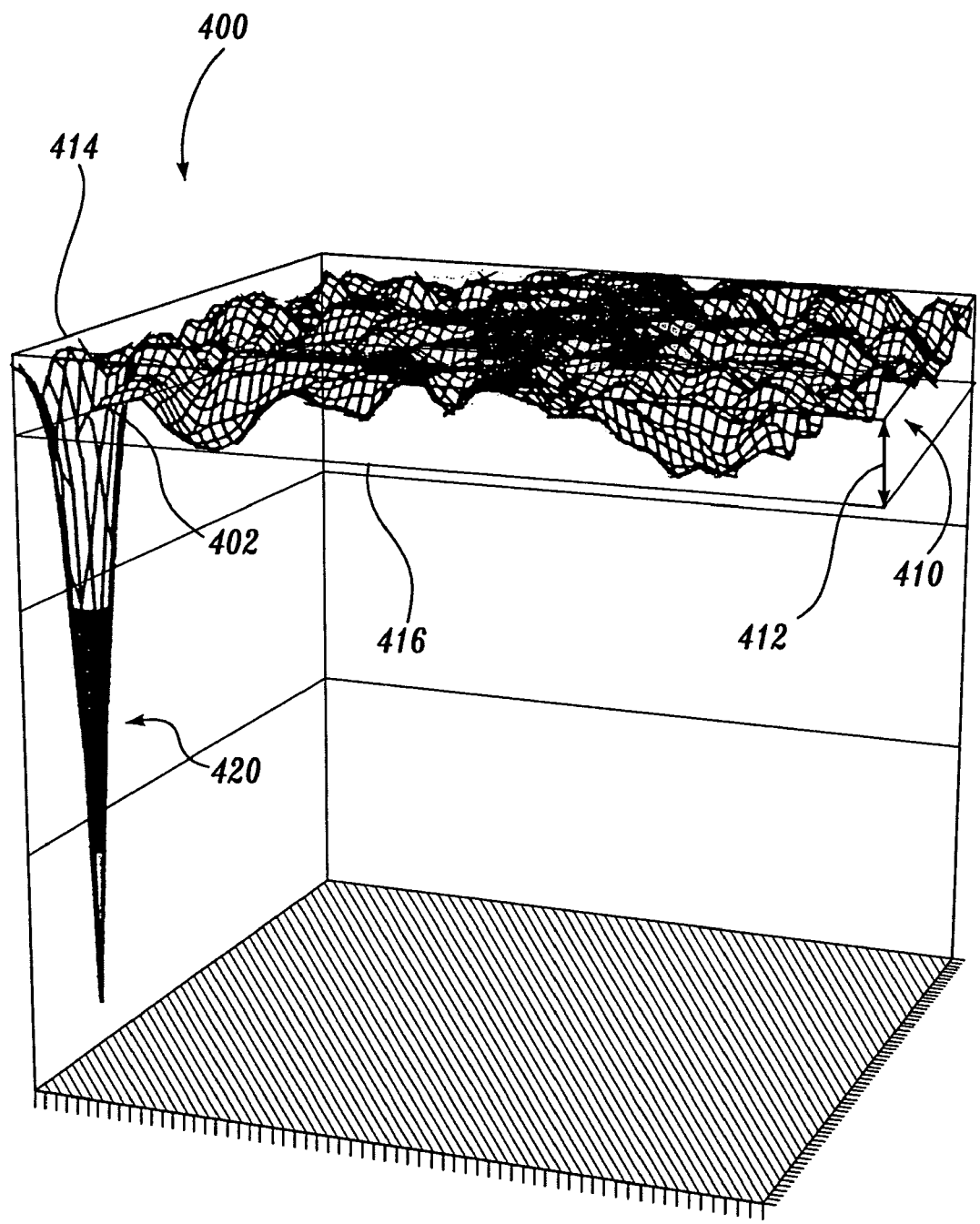
FIG. 4 is a graph illustrating the results of comparing first and second speckle images using the conventional comparison technique and the conventional difference correlation function, when the images are offset in two dimensions at successive pixel displacements.

FIG. 4 is a graph of an absolute value of the difference (AVD) correlation function 400 obtained by correlating a displaced and a reference image, where the displaced image is displaced in two dimensions relative to the reference image. Accordingly, as shown in FIG. 4, the correlation function 400 extends in two dimensions. The two dimensional correlation function 400 will be understood by analogy with the following descriptions regarding one dimensional correlation functions, such as the correlation function 500 described below, and the measurement stability and accuracy of a related 2-dimensional optical displacement sensor can be similarly enhanced when using the systems and methods described below with reference to one dimensional correlation functions.

Figure 5:
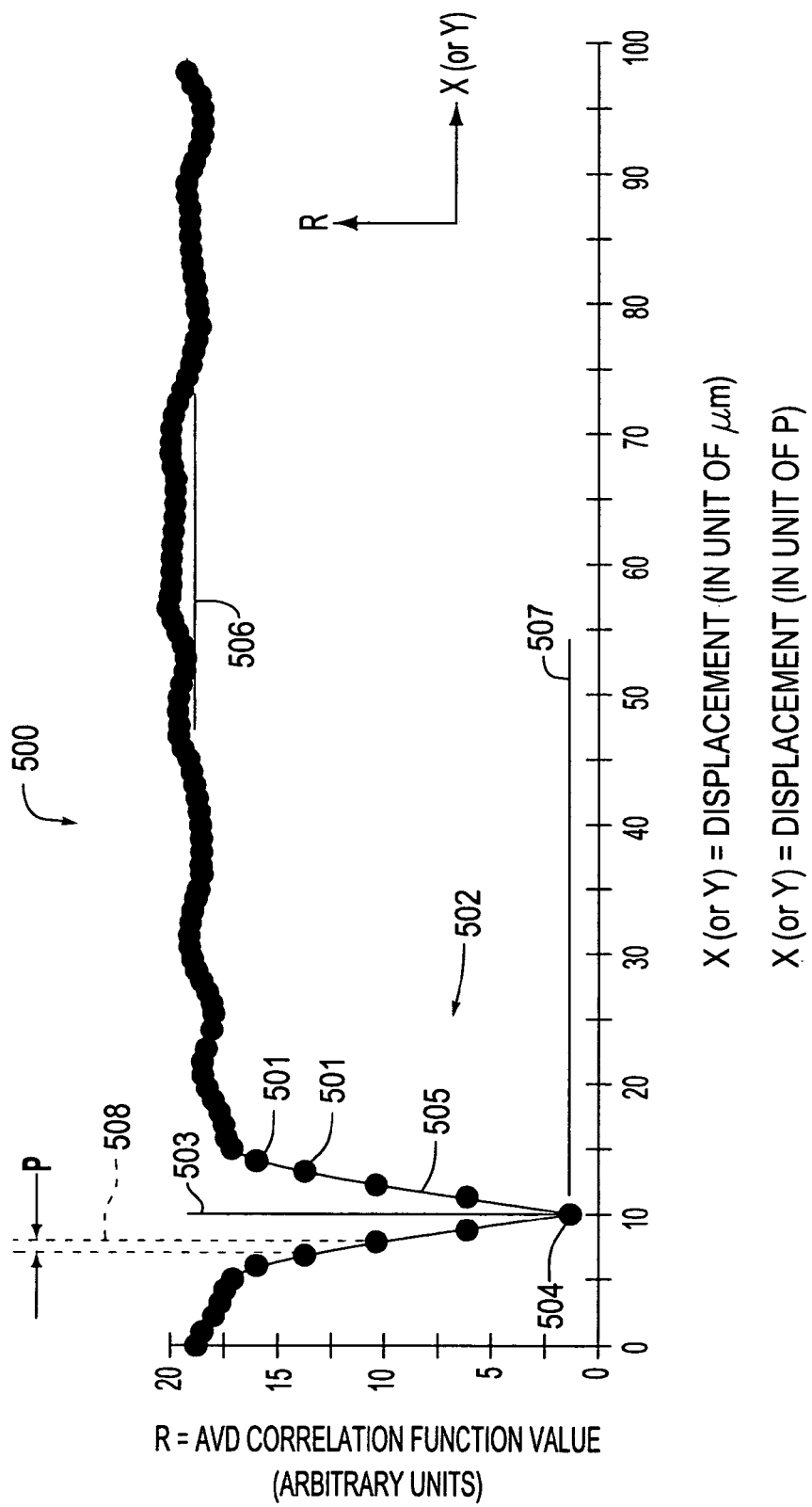
FIG. 5 is a graph illustrating the results of comparing first and second speckle images by an absolute value of difference correlation function when the images are offset at various pixel displacements along a measurement axis.

FIG. 5 is a graph 500 illustrating the results of comparing first and second speckle images by an absolute value of the difference correlation function when the images are offset at various pixel displacements along one dimension. As shown in FIG. 5, the extremum of the true continuous correlation function 505 occurs at a "peak offset" or "peak displacement" that is indistinguishable from the extreme correlation function value point 504. However, in general, the extremum does not occur at an offset which is an integer multiple of the pixel spacing, and therefore it does not generally coincide with an extreme correlation function value point. Therefore, the peak offset or displacement is generally found by estimating or "interpolating" the position of the peak of the continuous correlation function between the correlation function value points. The systems and methods disclosed in commonly assigned U.S. patent application Ser. No. 09/731,671, which is incorporated herein by reference, or any other suitable method, may be used to estimate the x-coordinate value (and/or y-coordinate value) of the actual peak offset or peak displacement from a selected set of the correlation function value points 501 in the vicinity of the peak region 502. The correlation function value of the most extreme correlation function value point 504, indicated by the line 507, may be used in conjunction with the value of the noise level or average value 506 to normalize the correlation function value point values in the region 502, so that the set of the correlation function value points 501 can be selected according to a normalized value range, in some exemplary embodiments. The x-coordinate value (or y-coordinate value) of the actual, or true, peak offset or peak displacement is indicated by a line 503 extending parallel to the R-axis and coinciding with the point that is the extremum of the true continuous correlation function 505. Assuming that the true continuous correlation function 505 is symmetric in the peak region 502, the line 503 is a symmetry axis and any point on the line 503 is indicative of the x-coordinate value (or y-coordinate value) of the peak offset or peak displacement of the true continuous correlation function 505, which may be found with sub-pixel accuracy, for example according to methods disclosed in the '671 application. It should be appreciated that this sub-pixel accuracy may correspond to accuracy and/or resolution on the order of 10 nm or less in various applications. The refined systems and methods disclosed herein are useful for achieving such high levels of accuracy and/or resolution by providing the required ultra-stable speckle images and high correlation quality. More generally, the previously outlined correlation techniques, or any other now known or later developed correlation technique, pattern-matching technique, template-matching technique, or the like, can be used to provide a high accuracy 1D or 2D displacement measurement that is enhanced by the image stabilizing systems and methods disclosed herein.

Figure 6:
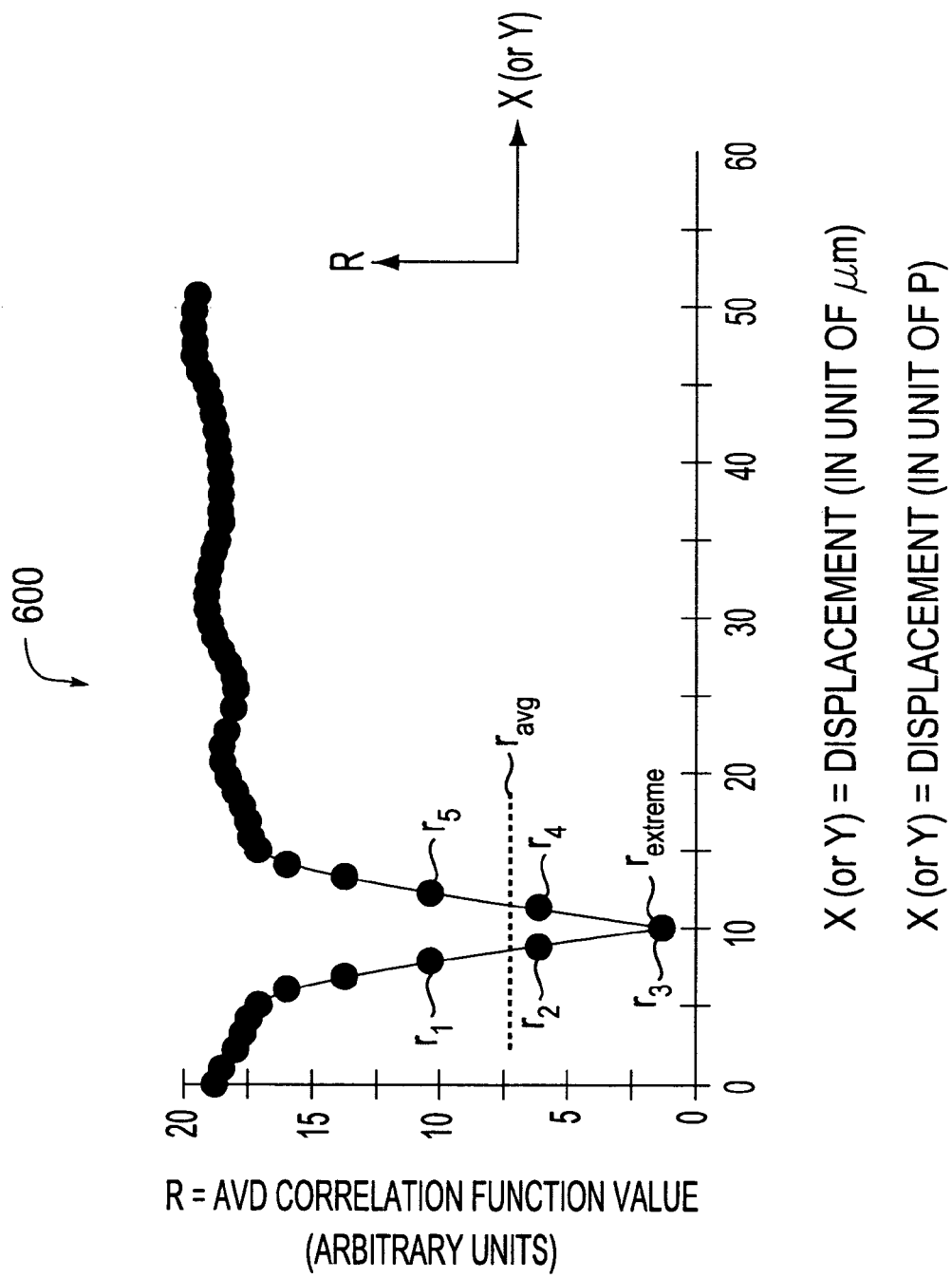
FIG. 6 is a graph illustrating a definition of correlation quality.

The term correlation quality (CQ) is used both in a general sense and in a specific sense herein. In either case, the term correlation quality (CQ) is analogous to an effective signal to noise (S/N) ratio for a correlation-type optical displacement sensor. In the general sense, the CQ is generally higher when the correlation peak region is relatively more narrow and its peak value relatively more extreme, that is, lower in value (or higher, depending on the correlation function used) compared to the noise level or average value of the correlation function. When the CQ is higher, the meaningful resolution and accuracy of a correlation type displacement measurement is generally better. FIG. 6 is a graph 600 that illustrates the definition of correlation quality when that term is used in a specific sense herein. With reference to FIG. 6, the CQ is defined for an AVD correlation function by the following equation:

$$CQ = 1 - \frac{r_{extreme}}{r_{avg}} \quad \text{(Eq. 1)}$$

For the quantitative CQ values shown in various figures and described herein, $r_{avg}$ is defined by averaging the values of a set of five of the most extreme correlation points, $r_1$-$r_5$ and $r_{extreme}$ is the value of the most extreme value in the set. This provides a measure of the relative depth of the AVD correlation function valley. CQ ranges between zero and one. A CQ value close to 1 represents a better or lower AVD valley (the best or sharpest peak) and CQ=0 indicates no valley (i.e., no correlation peak). For an analogous measure for a 2D correlation peak, a set of the 25 most extreme correlation points may be used.

The CQ is generally lower when "noise factors", that is, factors other than displacement, cause changes between a pair of correlation images. One important noise factor for speckle image correlation displacement sensors is a wavelength change or wavelength "drift" of the illumination source. One cause of such wavelength change or drift is a change or drift of the illumination source temperature.

Figure 7:
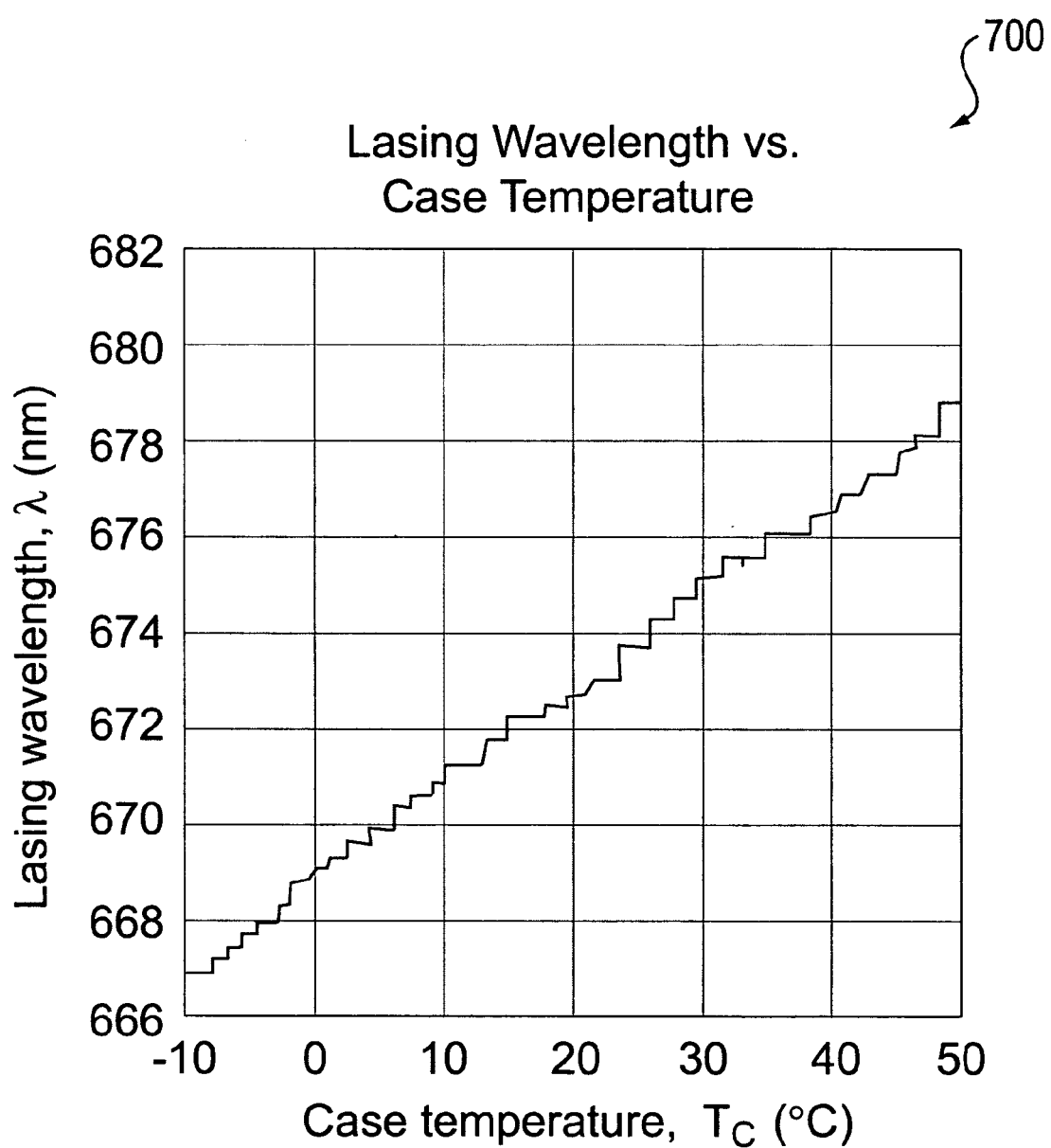
FIG. 7 is a graph illustrating lasing wavelength versus case temperature.

FIG. 7 is a graph 700 illustrating a plot of lasing wavelength versus case temperature for a typical semiconductor laser. The graph is shown to be generally increasing, starting from a case temperature of −10° C. and a corresponding lasing wavelength of approximately 667 nm, and increasing up to a case temperature of 50° C. and a corresponding lasing wavelength of approximately 679 nm. The graph includes approximately one "mode-hop" per degree Celsius, and an approximately 0.2 nm wavelength shift occurs during each mode-hop. Such temperature-driven wavelength shifts and mode hops cause a reduction in CQ and an associated increase in measurement error, as discussed further below.

One cause of decreasing CQ due to wavelength changes or drift is that when the laser wavelength changes, the intensity of a given speckle (as observed on the image plane by a detector array) tends to modulate periodically with the wavelength. For example, modeling a surface using a simplified 2 level roughness profile, the modulation will be sinusoidal. The following general equations illustrate how the intensity of a given speckle modulates with wavelength when the illumination and optical axes are both normal to the surface. For a simple 2-level system with height difference $\Delta z$:

$$I = \left(1 + A \cdot \sin\frac{2\pi\Delta z}{\lambda}\right) \quad \text{(Eq. 2)}$$

Generally, if the average roughness height is $\Delta z$, then the speckle intensity will undergo a complete intensity cycle when the wavelength $\lambda$ changes by $\delta\lambda = \lambda(\lambda/\Delta z)$. For a surface roughness of 10 μm and $\lambda$=600 nm, the fractional change in $\lambda$ corresponding to a complete intensity cycle is 6%. Thus, it should be appreciated that relatively small changes in the illumination source wavelength can cause significant changes in the speckle intensity pattern.

For a typical general roughness profile, the modulation will be much more complex. For a more realistic roughness profile, the speckle intensity will vary approximately as:

$$I = \sum_i \left(1 + A_i \cdot \operatorname{Sin}\frac{2\pi\Delta z_i}{\lambda}\right) \quad \text{(Eq. 3)}$$

where the sum i extends over the effective speckle light contributions from each "ith" roughness area feature of the object that contributes to the intensity of that given speckle. $A_i$ ($0 < A_i < 1$) is a parameter that describes the relative contribution of each roughness area feature having a height difference $\Delta z_i$.

The amount of speckle modulation due to a particular wavelength change also depends on the illumination angle relative to the surface. The following is a general approximate equation showing how the intensity of a given speckle varies with wavelength when the illumination axis is not normal to the surface (but the optical axis is). Here θ is the angle between the illumination beam and the surface normal and r is radius of a speckle cell:

$$I = \sum_i \left(1 + A_i \cdot \operatorname{Sin}\frac{2\pi\Delta z_i}{\lambda}\operatorname{Cos}\theta\right)\left(1 + \operatorname{Sin}\left(\frac{r \cdot \operatorname{Sin}\theta}{\lambda}\right)\right) \quad \text{(Eq. 4)}$$

Since $r^* \sin\theta$ is significantly larger than λ for significantly non-normal angles of incidence, the intensity changes are generally larger at larger angles of incidence θ. Thus, depending on the particular speckle cell, it is in some cases advantageous to have normal-incidence illumination (sin θ=0) in order to minimize the speckle intensity modulation.

It is important to note that the modulation phase for the different speckles within the image is completely random in that the whole image does not modulate in intensity, but rather, various parts of the image (i.e., individual speckles) modulate with a random phase in relation to other parts (speckles) of the image. Thus, the effect of wavelength change is to introduce random speckle modulations which lower the correlation function peak value relative to the noise (not electronic noise, but correlation function noise arising from random image changes). This, in turn, will cause a reduction in the meaningful system resolution and accuracy.

Figure 8:
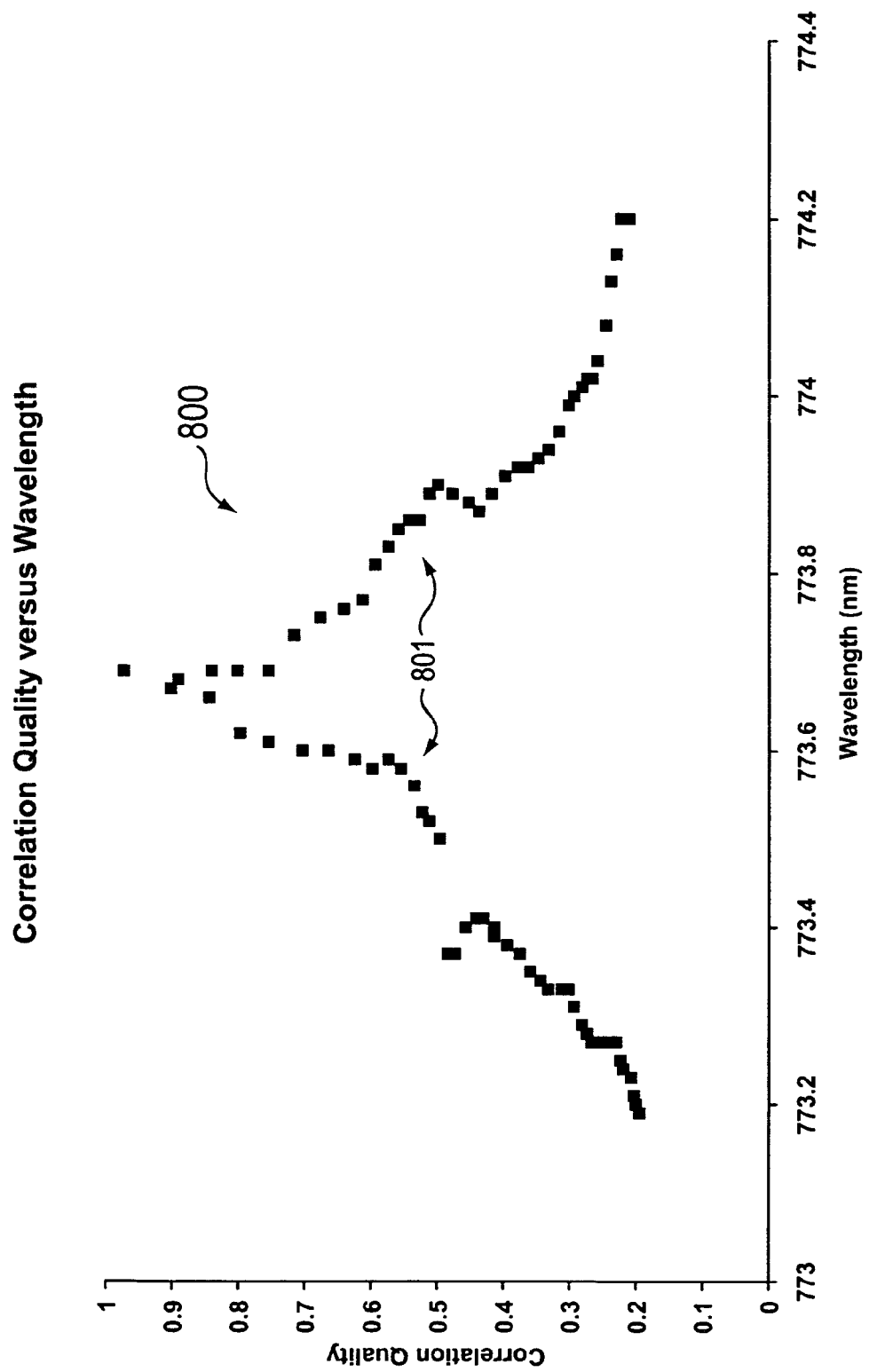
FIG. 8 is a graph illustrating correlation quality versus wavelength.

FIG. 8 is a graph 800 illustrating experimental data indicating an AVD correlation quality CQ versus wavelength for an optical position transducer similar to that shown in FIGS. 2A and 2B. The single reference image used for each of the data points was acquired at a wavelength of approximately 773.7 nm. As shown in FIG. 8, a collection of data points 801 representing the correlation quality versus wavelength begins at a wavelength of approximately 773.2 nm and a corresponding CQ of approximately 0.2. The CQ values of the collection of data points 801 are then shown to increase to a maximum value at approximately 773.7 nm, with a corresponding CQ value greater than 0.95. The CQ values of the collection of data points 801 are then shown to decrease, the rightmost data point having a wavelength of approximately 774.2 nm and a corresponding CQ value of approximately 0.2. This graph demonstrates that correlation quality decreases significantly when the comparison image illumination wavelength differs by only a small amount from the illumination wavelength of the reference image. The maximum correlation quality occurs when the reference image and the current image are obtained with the same wavelength. Decreased CQ leads to greater measurement uncertainty and degrades the measurement accuracy. Thus, to attain the highest possible meaningful correlation values and highest displacement measurement accuracy, it is advantageous to stabilize the illumination wavelength, for example, within +/−0.2 nm for the system corresponding to the data shown in FIG. 8.

Figure 9:
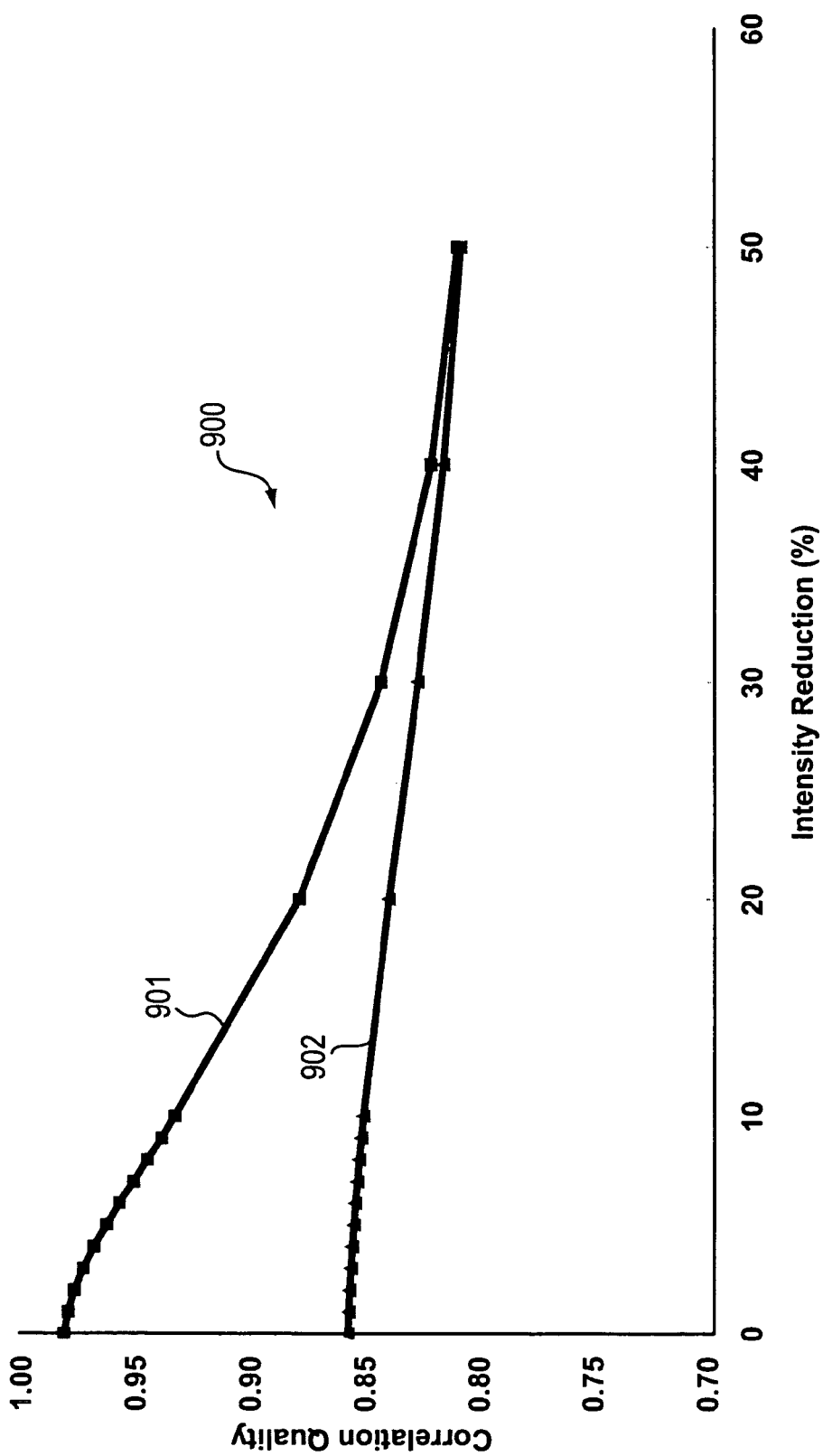
FIG. 9 is a graph illustrating correlation quality versus illumination intensity reduction.

An overall image intensity reduction due to varying illumination power can also cause a decrease in CQ. FIG. 9 is a graph 900 of simulation data illustrating an AVD correlation function CQ versus intensity reduction, for an optical position transducer similar to that shown in FIGS. 2A and 2B. The graph is shown for two different displacements, or correlation positions, x=0 um (no displacement) and x=55 um (a displacement corresponding to about one half of an image frame in this case). More specifically, a line 901 shows CQ versus intensity reduction for the position x=0 um, wherein the line begins at an intensity reduction of 0% and a correlation quality of approximately 0.975, and ends at an intensity reduction of approximately 50% and a correlation quality of approximately 0.81. A line 902 represents the position x=55 um, and begins at an intensity reduction of 0% and a correlation quality of approximately 0.86 and ends at an intensity reduction of 50% and a correlation quality of approximately 0.81. This data shows that, in general, a relatively ideal correlation peak value is rapidly degraded by the pixel intensity differences that occur throughout the reference and comparison images due an illumination intensity or power change.

Figure 10:
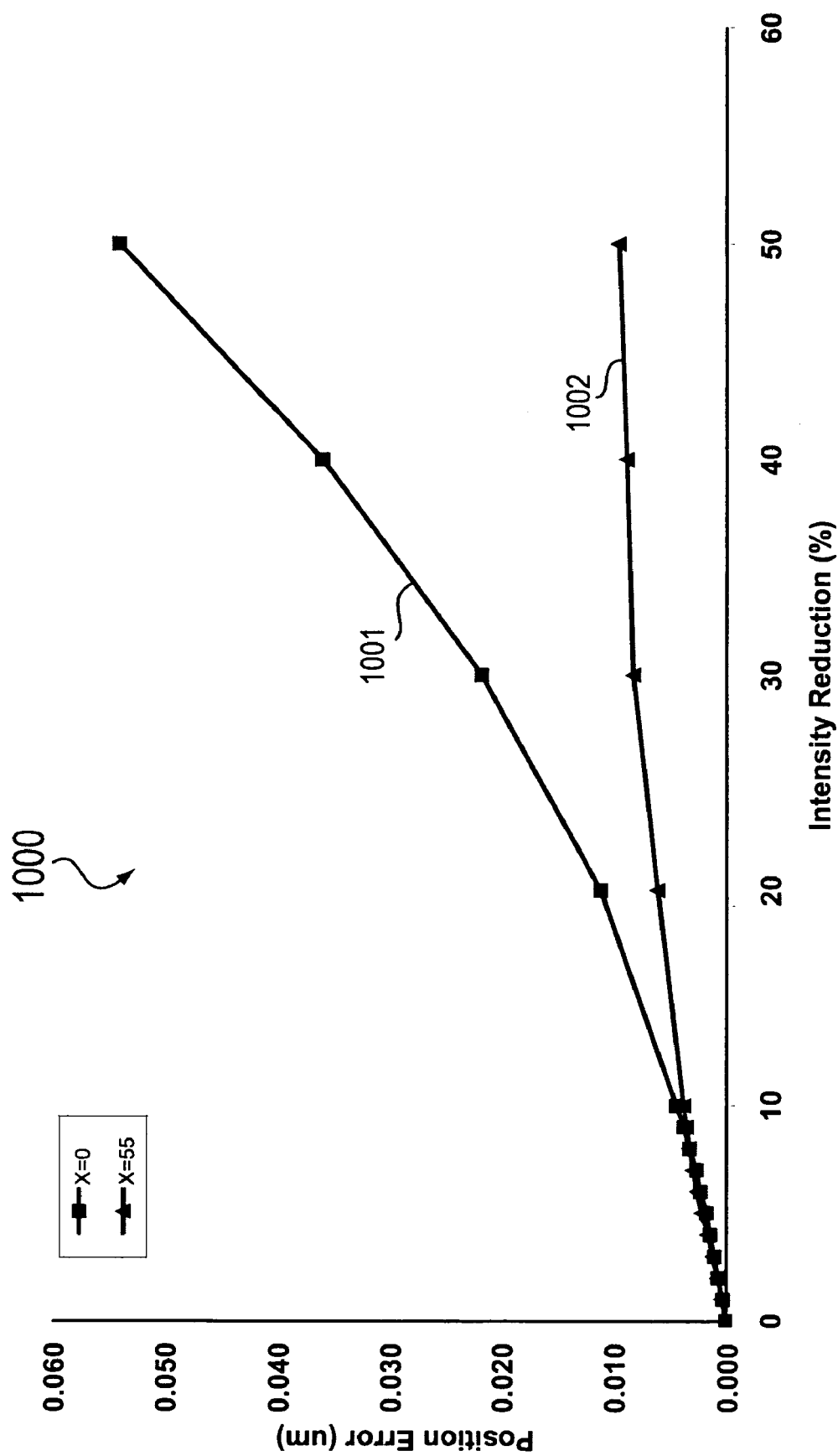
FIG. 10 is a graph illustrating position output change or error versus illumination intensity reduction.

FIG. 10 is a graph 1000 of simulation data, illustrating position drift or error versus intensity reduction corresponding to the data for the positions x=0 um and x=55 um that are illustrated in FIG. 9. As shown in FIG. 10, for the position x=0 um, a line 1001 begins at an intensity reduction of 0% and a position error of 0 um and increases to an intensity reduction of approximately 50% with a corresponding position error of approximately 0.055 um. For the position x=55 um, a line 1002 begins at an intensity reduction of 0% and a position error of 0 um and increases to an intensity reduction of approximately 50% with a corresponding position error of approximately 0.010 um. Taken together, the data of FIGS. 9 and 10 show that when the CQ changes significantly due to illumination power variation, a relatively larger erroneous position drift occurs. Conversely, when the CQ changes by a relatively smaller amount, a relatively smaller erroneous position drift occurs. Thus, for good correlation values and good displacement measurement accuracy, it is advantageous to stabilize the illumination power or intensity. For example, for the system corresponding to the data shown in FIGS. 9 and 10, within a range of 30% variation errors are less than approximately 22 nm, within a range of 10% errors are less than 5 nm, and the errors continue to decrease proportionately as the illumination intensity variation is reduced below 10%.

In addition to the previously described effects on CQ due to illumination intensity or power changes, another effect also drives the measurement sensitivity to wavelength change. This effect leads directly to a translation of the speckle pattern. This effect is illustrated in a simplified form in FIG. 11, which shows the component rays 1101 and 1102 of two coherent lights rays wherein the component rays 1101 and 1102 are parallel to a plane that is both parallel to a measuring axis direction 1107 and perpendicular to an effective plane of a diffusely-scattering surface 300'. The component rays 1101 and 1102 are from a coherent wavefront incident on a diffusely-scattering surface 300'. The rays have a path difference $\Delta D = 2\alpha \cdot \cos\alpha$ to the surface 300', where 2α is the separation between the rays at the scale surface 300' along the measuring axis direction 1107 and α is the angle between the nominal illumination direction and the direction of the measuring axis 1107, which is parallel to the plane of the surface 300'. When the wavelength of incident light changes from $\lambda_1$ to $\lambda_2$, the number of wavelengths included in the path difference ΔD is changed by an amount $N_1$ given by:

$$N_1 = \frac{\Delta\lambda}{\lambda_1\lambda_2} 2a\cos\alpha \quad (\text{Eq. 5})$$

Figure 11:
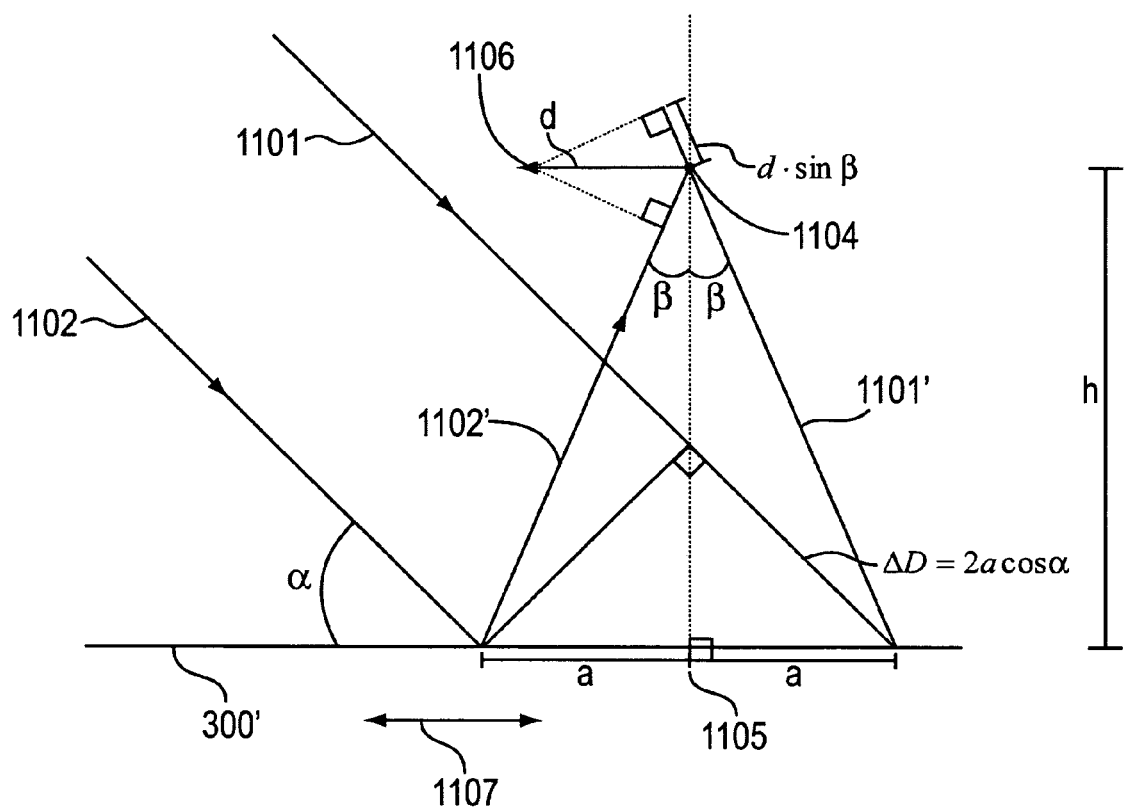
FIG. 11 is an illustration of a speckle displacement that occurs as a result of a wavelength change.

As shown in FIG. 11, the scattered rays 1101' and 1102' in the plane of the component rays 1101 and 1102 interfere at a point 1104 at a height h from surface 300'. The angle β is the angle between each of the scattered rays 1101' and 1102' and a line in the plane of the scattered rays 1101' and 1102' that runs through the point 1104 and that is perpendicular to the measuring axis direction 1107. As the wavelength changes from $\lambda_1$ to $\lambda_2$, the phase relationship between the scattered rays 1101' and 1102' and the resulting speckle intensity that was originally found at the point 1104, will move a distance d along a direction parallel to the measuring axis at the height h from the surface 300', to a point 1106. Accordingly, the ray 1102' will be shortened by a distance that is approximately d·sin β and the ray 1101' will be lengthened approximately by this amount. The number of wavelengths $N_2$ included in the pathlength difference between the scattered rays arriving at the point 1106 is thus approximately $$N_2 = \frac{2d\sin\beta}{\lambda_2} \quad (\text{Eq. 6})$$

For a small numerical aperture (i.e., a/h is small), we can set $$\sin\beta = \frac{a}{h} \quad (\text{Eq. 7})$$

and by setting $N_1$ and $N_2$ to be equal, the amount of speckle drift or displacement d parallel to the measuring axis at a height h from the surface 300' can be obtained:

$$d = \frac{\Delta\lambda}{\lambda_1} h \cos\alpha \quad (\text{Eq. 8})$$

It should be appreciated that according to EQUATION 8 when the illumination direction is not normal to the measuring axis direction, and the speckle imaging plane, that is, the focal plane of the readhead, is located at a non-zero height h above the surface 300', a wavelength change will lead to a speckle position change or drift within the correlation image, and produce a displacement measuring error along the measuring axis direction.

Figure 12:
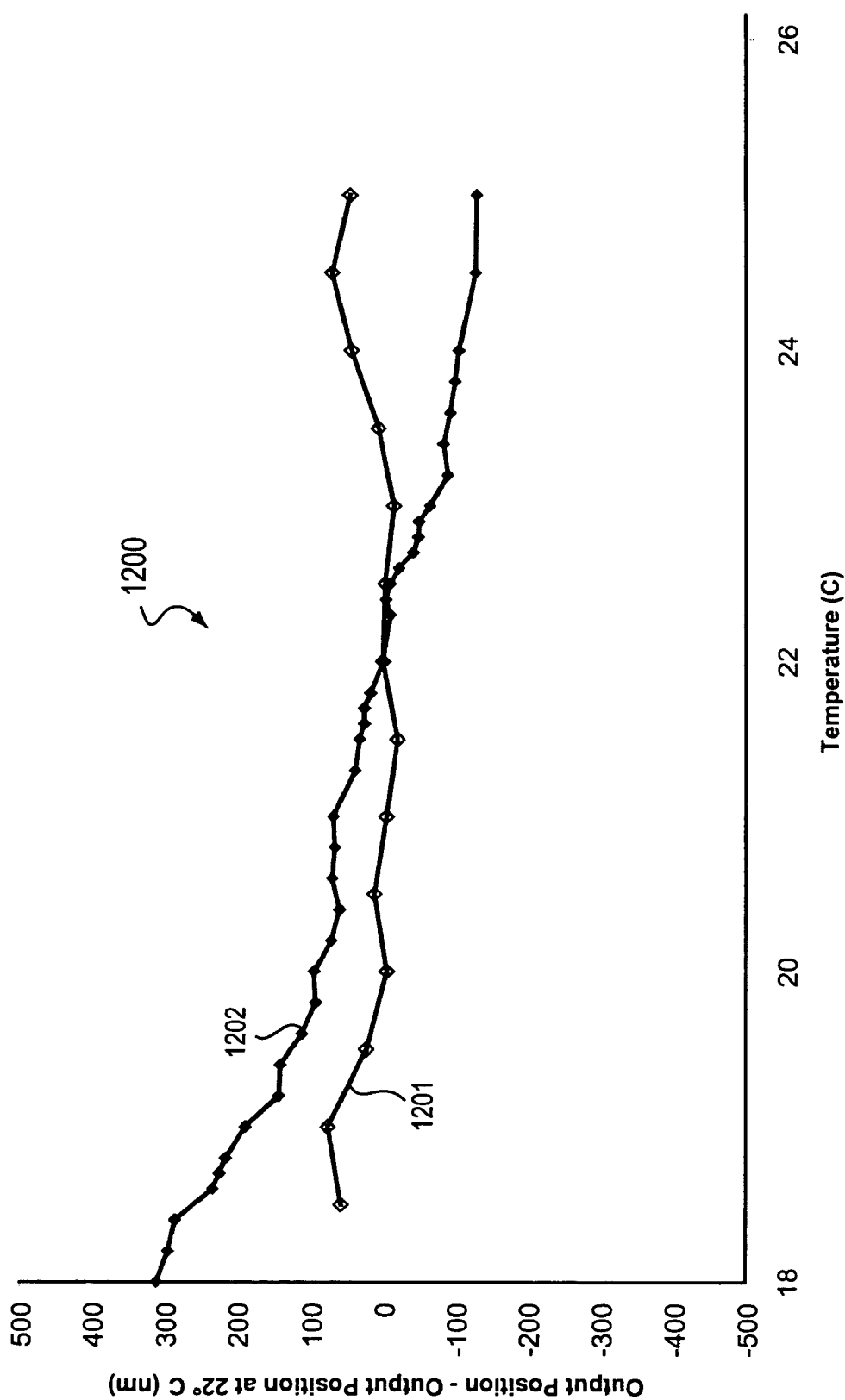
FIG. 12 is a graph illustrating position output drift or error versus light source temperature, for two different illumination angles.

FIG. 12 is a graph 1200 illustrating position drift or error versus illumination source temperature, for a laser diode illumination source that has a wavelength temperature sensitivity of approximately 0.16 nm per degree C., and an optical position transducer configuration similar to that shown in FIGS. 2A and 2B. The temperature values span approximately 7 degrees C., from approximately 18 degrees C. to approximately 25 degrees C. The corresponding illumination wavelengths span approximately 1.1 nm, increasing from approximately 652.8 nm at 18 degrees C. to approximately 653.9 nm at 25 degrees C. In this case the readhead is held fixed relative to the optically diffusing, or optically rough, surface, and only the laser temperature and, therefore, the temperature-dependent wavelength, are varied. Assuming a reference temperature of 22 degrees C., the graph 1200 shows error results for two different values of the angle α between the illumination direction and the measuring axis direction, in a plane perpendicular to the scale surface and parallel to the measuring axis. The effective value of h for the data shown in the graph 1200 is approximately 0.5 mm. The y-axis describes the amount of lateral speckle displacement in nanometers from the speckle position at 22 degrees Celsius.

The line 1201 connects the set of data points corresponding to α=90 degrees. This data is consistent with EQUATION 8; showing that for α=90 degrees, that is, cos α=0, the variation in the position errors associated with the full range of temperature and wavelength variations is less than approximately 100 nm. Furthermore, the position error shows no consistent relationship to the changing temperature or wavelength, indicating that it is substantially insensitive to these factors. In contrast, the line 1202 connecting the set of data points corresponding to α=45 degrees, that is, cos α=0.707, does show a consistent relationship to the changing temperature or wavelength, indicating that it is sensitive to these factors, in agreement with EQUATION 8. The variation in the position errors associated with the full range of temperature and wavelength variations is approximately 440 nm, which is in rough agreement, within 25%, of the variation predicted by the simple model embodied in EQUATION 8.

Thus, position errors related to temperature-induced wavelength changes are minimized or eliminated by a readhead configuration the provides an illumination angle of α=90°, that is, if the scale surface is illuminated along a plane perpendicular to the measurement axis. Furthermore, it is particularly advantageous if the illumination is also along a direction normal to the scale surface. This fulfills the condition α=90° for both axes of a 2D measurement system, or maintains the desired condition despite readhead yaw misalignment in 1D systems. However, it should be appreciated that if design constraints do not permit an illumination angle of α=90°, it is still beneficial for an illumination angle α to be made as large as the design constraints allow. For example, in comparison to α=45°, if the illumination angle α is increased to at least α=70°, then according to EQUATION 8, the speckle drift error related to wavelength changes will be reduced by approximately half. Thus, if an illumination angle of α=90° cannot be achieved, an illumination angle of α=70° may be used, for example, to provide a strong measure of wavelength-related error reduction.

Figure 13:
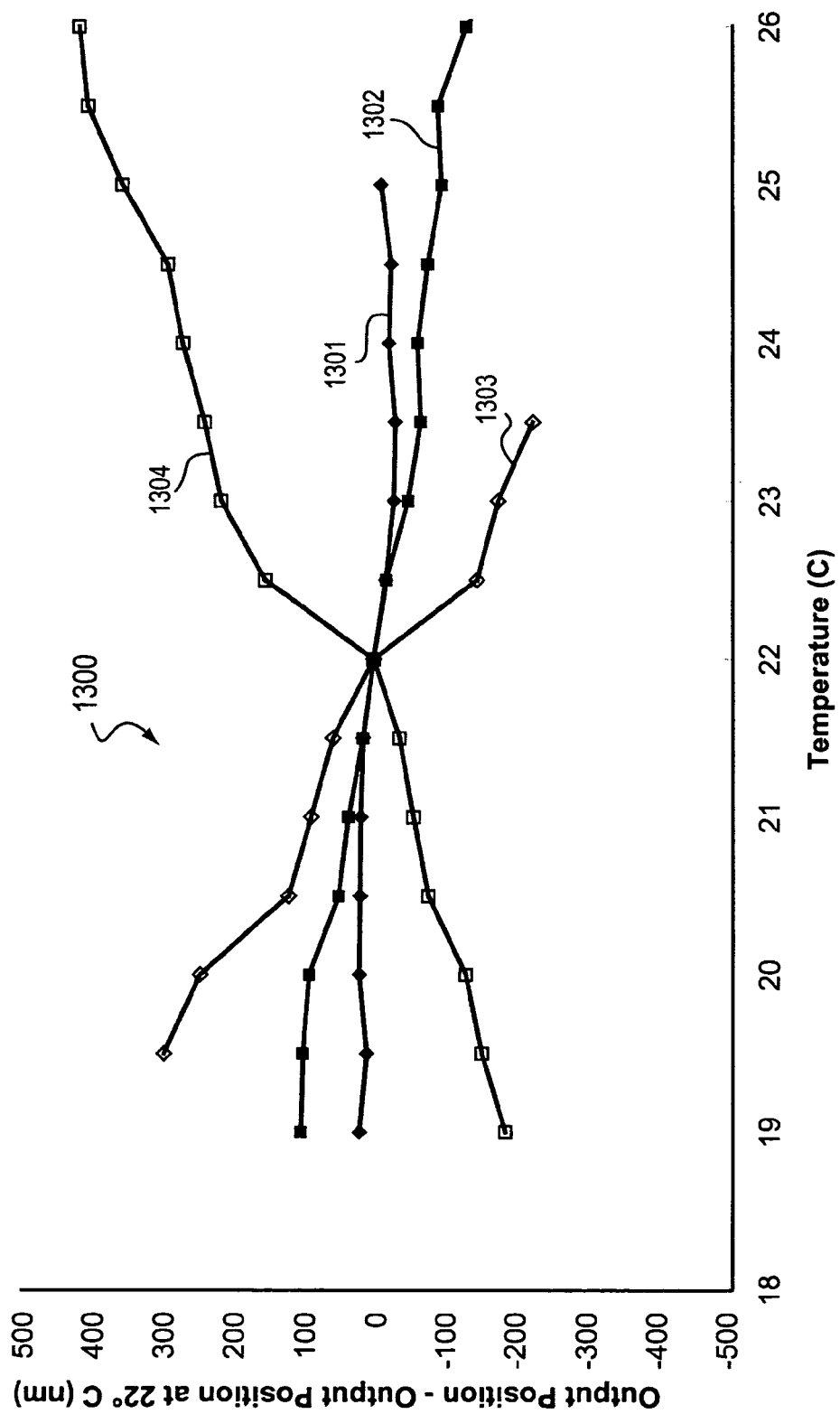
FIG. 13 is a graph illustrating position output change or error versus temperature for various deviations of a speckle-producing surface from the focal plane of a readhead.

FIG. 13 is a graph 1300 illustrating position drift or error versus illumination source temperature, for a laser diode illumination source that has a wavelength temperature sensitivity of approximately 0.13 nm per degree C., and an optical position transducer configuration similar to that shown in FIGS. 2A and 2B. The temperature values span approximately 7 degrees C., from approximately 19 degrees C. to approximately 26 degrees C. The corresponding illumination wavelengths span approximately 1.1 nm, increasing from approximately 653.4 nm at 19 degrees C. to approximately 654.3 nm at 26 degrees C. In this case the illumination angle is fixed at approximately α=37.5 degrees between the illumination direction and the measuring axis direction, in a plane perpendicular to the scale surface and parallel to the measuring axis. The readhead is held fixed relative to the optically diffusing, or optically rough, surface, and only the laser temperature and, therefore, the temperature-dependent wavelength, are varied. Assuming a reference temperature of 22 degrees C., the graph 1300 shows error results for four different values of the height h between the imaged speckles and the optically rough or diffusing surface that gives rise to the speckles.

It should be appreciated that the height h is the distance between the readhead optical system focal plane, which is the nominal plane of the imaged speckles, and the optically diffusing surface. In other words, the height h is the same as the distance of the optically diffusing surface from the focal plane. Thus, for example, when the readhead is operationally positioned such that its optical system is approximately focused on the optically rough or diffusing surface, then the effective height h is approximately zero.

The line 1301 connects the set of data points corresponding to h=0.0 mm, that is, the gap between the readhead and the optically diffusing surface is set such that the optically diffusing surface coincides with the focal plane of the readhead. This data is consistent with EQUATION 8; showing that for h=0.0 mm, the variation in the position errors associated with the full range of temperature and wavelength variations is less than approximately 75 nm, which is the smallest variation of the tested values for h, and the position error appears to be relatively insensitive to the changing temperature or wavelength.

In contrast, the line 1302 connecting the set of data points corresponding to h=+0.5 mm, does show a consistent relationship to the changing temperature or wavelength, indicating that it is sensitive to these factors, in agreement with EQUATION 8. The variation in the position errors associated with the full range of temperature and wavelength variations is approximately 300 nm.

Similarly, the line 1303 connecting the set of data points corresponding to h=+1.0 mm, shows even more sensitivity to the changing temperature or wavelength than the line 1302, roughly doubling in sensitivity comparison to the line 1302, in rough agreement with the proportionality to h shown in EQUATION 8. The variation in the position errors for approximately a 4 degree C. range of temperatures and the associated wavelength variations is approximately 520 nm.

Furthermore, the line 1304, connecting the set of data points corresponding to h=−0.5 mm, shows a consistent relationship to the changing temperature or wavelength that is opposite in sign compared to the sensitivities associated with the positive values of h, as implied by EQUATION 8. The variation in the position errors associated with the full range of temperature and wavelength variations is approximately 600 nm. This sensitivity is of an opposite sign and stronger than the sensitivity shown by the line 1302, which corresponds to the same magnitude h, but the opposite sign. The sensitivity having the opposite sign is in agreement with EQUATION 8, but the simple model used for the derivation of EQUATION 8 does not explicitly consider negative values of h and does not explain the observed greater sensitivity. However, relying upon the observed behavior, it is implied that a mounting or alignment which places the optically diffusing surface at a given distance beyond the focal plane of the readhead produces less wavelength sensitivity than a mounting or alignment which places the optically diffusing surface at that same distance inside of the focal plane of the readhead. Thus, in some applications where significant static or dynamic variations in the height h are expected, to minimize the potential overall system errors it may be advantageous to specify, or attempt to achieve, a nominal mounting position that locates the optically diffusing surface slightly beyond the focal plane of the readhead, in order to balance the respective errors due to positive and negative deviations from the nominal mounting position. However, in general, EQUATION 8 and the results shown in FIG. 13 indicate that a mounting position that locates the optically diffusing surface at the focal plane of the readhead will nominally eliminate measurement errors due to wavelength variations. Thus, such a nominal mounting position is preferred in most applications. Of course, combining an illumination angle which is orthogonal to the measuring axis and/or normal to the optically diffusing surface as previously described, with a mounting position that nominally locates the optically diffusing surface at the focal plane of the readhead will produce an optical displacement sensor that even more robustly minimizes errors due to wavelength changes.

It should be appreciated that having benefit of the previously disclosed principles and design and operation data, along with various commercially available components, and having benefit of the methods disclosed further below, it is possible to provide a speckle image correlation displacement sensor or readhead that, when the readhead is held at a fixed displacement position relative to an optically diffusing scale surface that gives rise to speckles, is operable to provide displacement values that do not vary by more than +/−50 nanometers relative to their average value, throughout at least a 12 hour operation period beginning no more than 1 hour, or 30 minutes, or even 10 minutes or less, after initial turn-on of the readhead, in an environment that is typically provided where submicron resolution measurements are expected. Furthermore, with reasonable effort, it is possible to provide a speckle image correlation displacement sensor or readhead that is operable to provide displacement values that do not vary by more than +/−25 nanometers, or even +/−10 nanometers or less relative to their average value, under the various operating periods and environmental conditions outlined above.

Figure 14:
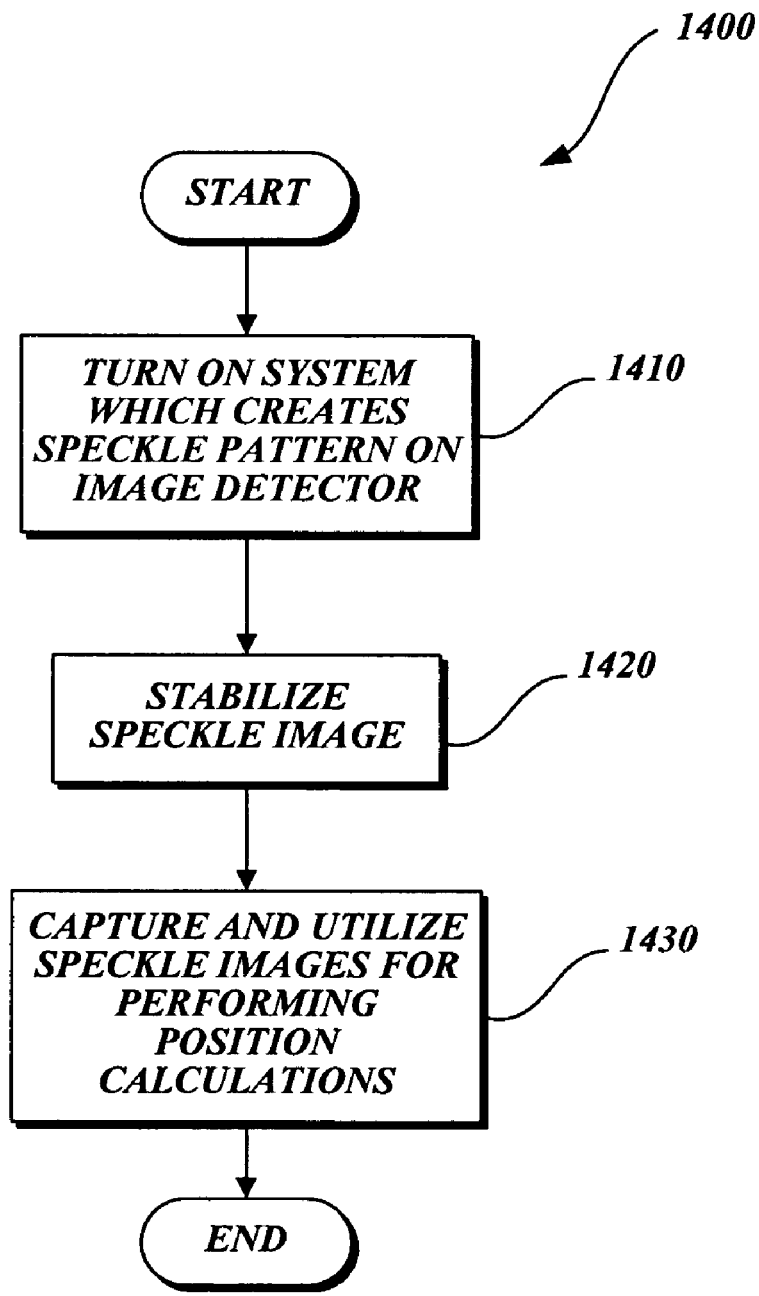
FIG. 14 is a flow diagram illustrative of a routine for stabilizing a speckle pattern.

FIG. 14 is a flow diagram illustrative of a routine 1400 for stabilizing a speckle image. At a block 1410, the system is turned on, which creates a speckle pattern on the image detector. At a block 1420, the speckle image is stabilized against wavelength variations, illumination intensity variations, or the like, according to one or more of the configurations and/or principles disclosed herein. At a block 1430, stabilized speckle images are captured and utilized for performing displacement calculations.

Figure 15:
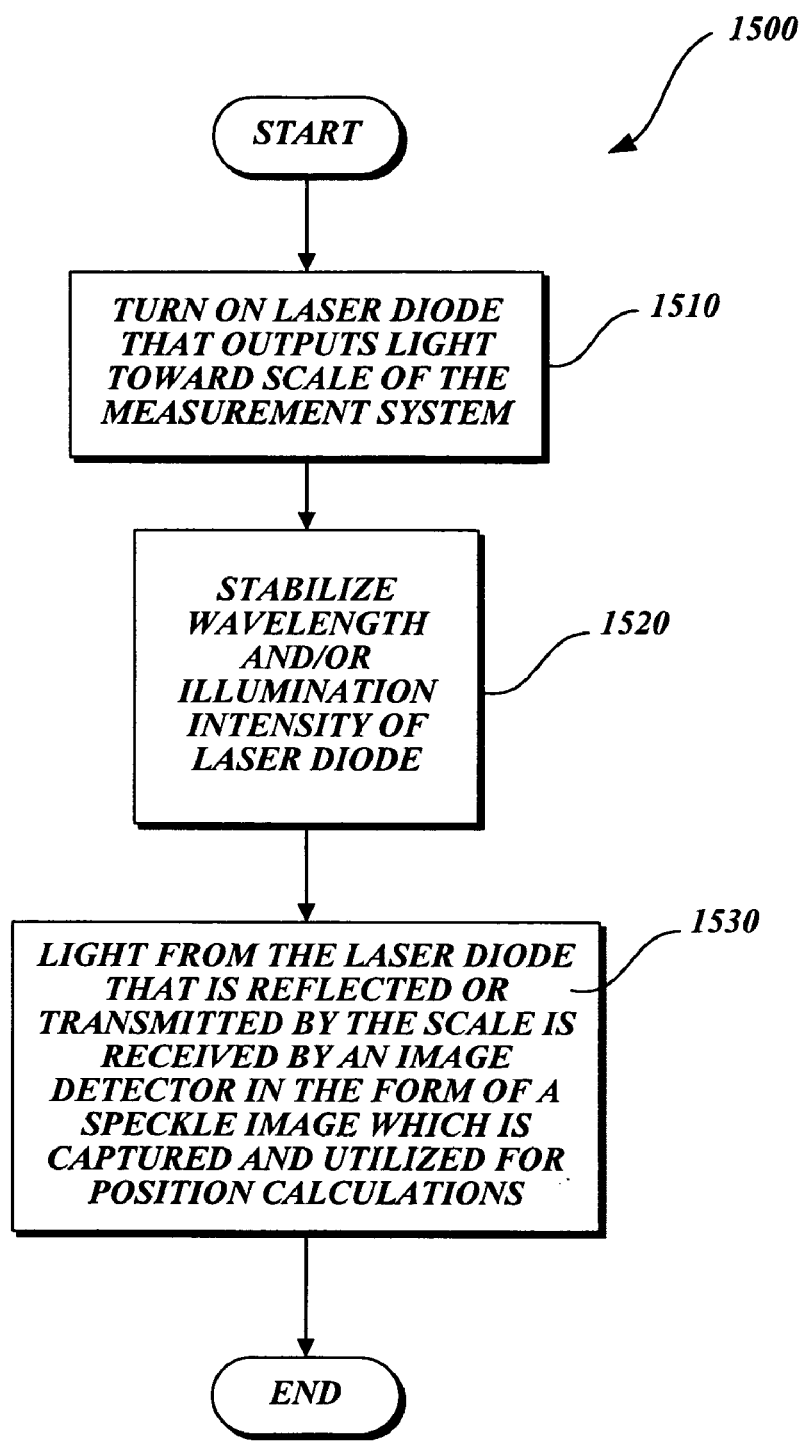
FIG. 15 is a flow diagram illustrative of a routine for stabilizing a wavelength of a laser diode.

In addition to the previously described techniques for minimizing or "rejecting" the errors associated with a change in illumination wavelength, the accuracy and/or robustness of an optical displacement sensor can be enhanced by reducing illumination wavelength and/or intensity variations when acquiring measurement images. Thus FIG. 15 is a flow diagram illustrative of a routine 1500 for stabilizing the wavelength and/or intensity of a laser diode. At a block 1510, a laser diode is turned on to output light toward the scale of the measurement system. At a block 1520, the wavelength and/or illumination intensity of the laser diode is actively stabilized, as described further below, or passively stabilized by insuring that the operating condition of the laser diode effectively reaches steady-state. At a block 1530, the light from the laser diode that is reflected or transmitted by the scale surface is received by an image detector in the form of a speckle image which is captured and utilized for position calculations.

Figure 16:
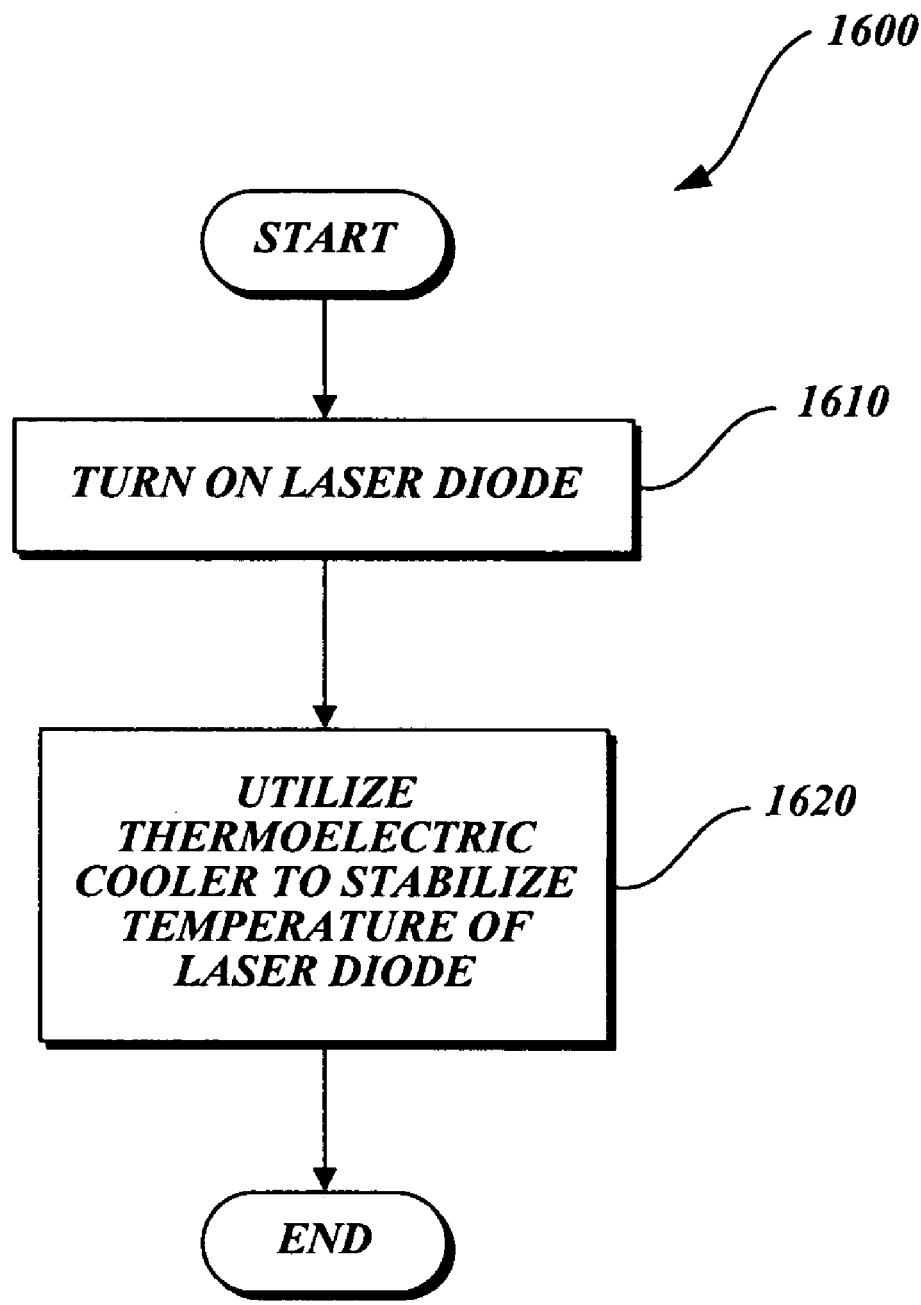
FIG. 16 is a flow diagram illustrative of a routine for utilizing a thermoelectric cooler to stabilize the temperature and corresponding wavelength of a laser diode.

FIG. 16 is a flow diagram illustrative of a routine 1600 for stabilizing the temperature and corresponding wavelength of a laser diode. At a block 1610, the laser diode is turned on. At a block 1620, a thermoelectric cooler (TEC) is utilized to stabilize the temperature of the laser diode. It will be appreciated that numerous types and configurations of thermoelectric coolers and associated control circuitry may be utilized for the purpose of stabilizing the temperature and corresponding wavelength of the laser diode. Suitable miniature TEC's and circuit designs are available from numerous sources, for example, TEC's are available from Supercool US Inc, 819 A Street, San Rafael, Calif. 94901. An exemplary temperature stabilizing control circuit is disclosed in U.S. Pat. No. 4,631,728, which is incorporated herein by reference.

Figure 17:
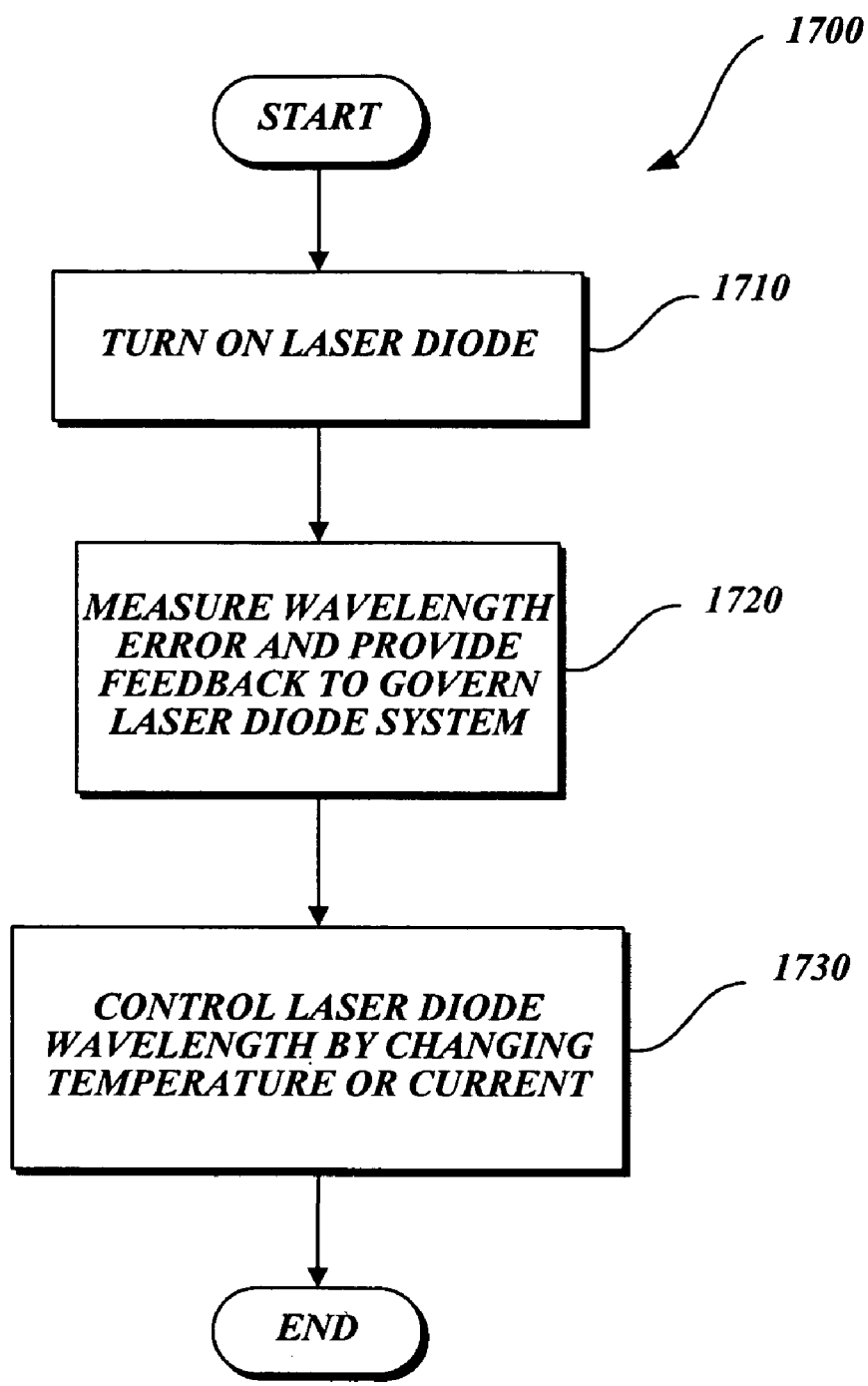
FIG. 17 is a flow diagram illustrative of a routine for utilizing feedback of a wavelength of a laser diode system for controlling the wavelength.

FIG. 17 is a flow diagram illustrative of a routine 1700 for utilizing feedback of the wavelength to stabilize the wavelength of the laser diode. At a block 1710, the laser diode is turned on. At a block 1720, the wavelength of the laser diode is monitored and a related control signal is fed back to the system. At a block 1730, the wavelength of the laser diode is controlled by changing either the temperature or the current of the laser diode. It will be appreciated that in some embodiments, controlling the temperature may be preferred over controlling the current, as the latter may also cause undesirable changes to the power of the laser diode. One suitable system is described in "A Simple Etalon-Stabilized Visible Laser Diode, J C Brasunas, Meas. Sci. Technol. 13 No 8 (August 2002) N67-N71, which is incorporated herein by reference.

Figure 18A:
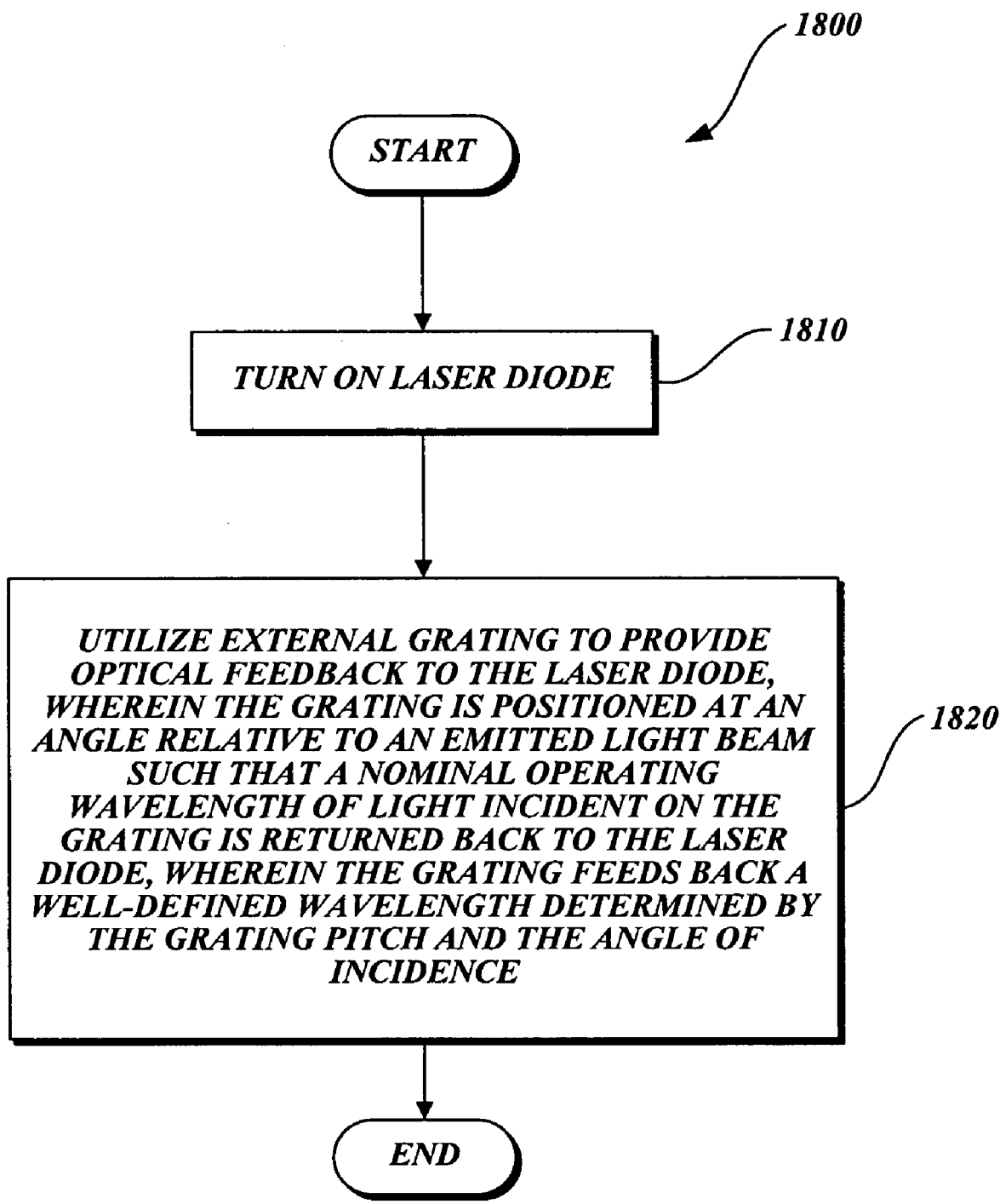
FIG. 18A is a flow diagram illustrative of a routine for utilizing feedback from an external grating to stabilize the wavelength of a laser diode.

FIG. 18A is a flow diagram illustrative of a routine 1800 for utilizing an external grating to control the wavelength of a laser diode used in an optical displacement sensor. At a block 1810, the laser diode is turned on. At a block 1820, an external grating is utilized to provide optical feedback to the laser diode, wherein the grating is positioned at an angle relative to an emitted beam such that only light of a particular wavelength that is the nominal operating wavelength is diffracted back along the path to the laser diode. The grating feeds back only a well defined wavelength determined by the grating pitch and the angle of incidence.

Figure 18B:
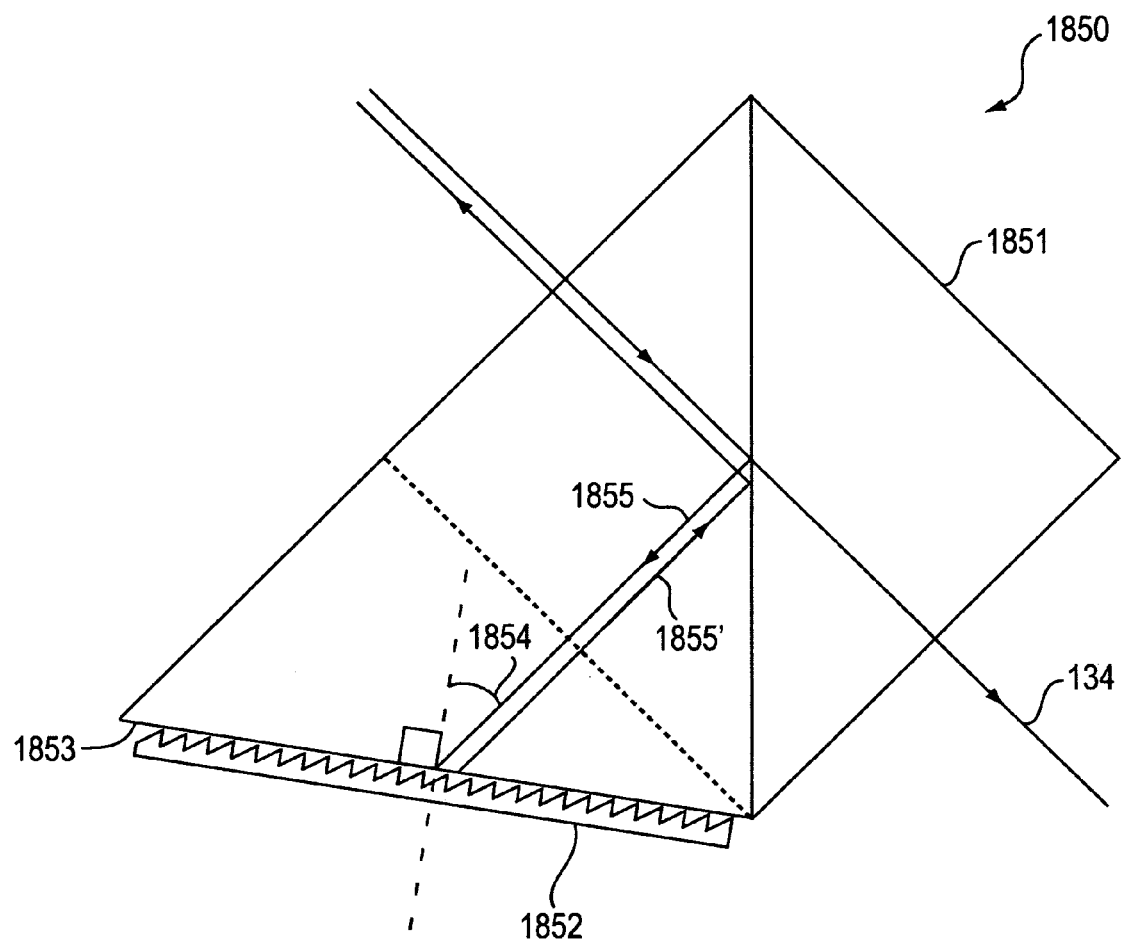
FIG. 18B is an optical assembly usable to implement the routine illustrated in FIG. 18A.

FIG. 18B shows one optical configuration for implementing the method of FIG. 18A. FIG. 18B shows a miniature optical assembly 1850 positioned along the path of the emitted light 134 shown in FIG. 2A. The optical assembly 1850 includes a beam splitter 1851, and a reflective grating 1852 positioned on an angled surface 1853 such that the angle 1854 corresponds to the Littrow angle for a desired wavelength of light. Accordingly, the beam splitter deflects a portion of the emitted light 134 along a path 1855 toward the grating 1852 and the desired wavelength of light is diffracted back at the Littrow angle along the path 1855' and reflected by the beam splitter 1851 to enter the laser diode source (not shown) to stabilize its output at the desired wavelength.

Figure 19:
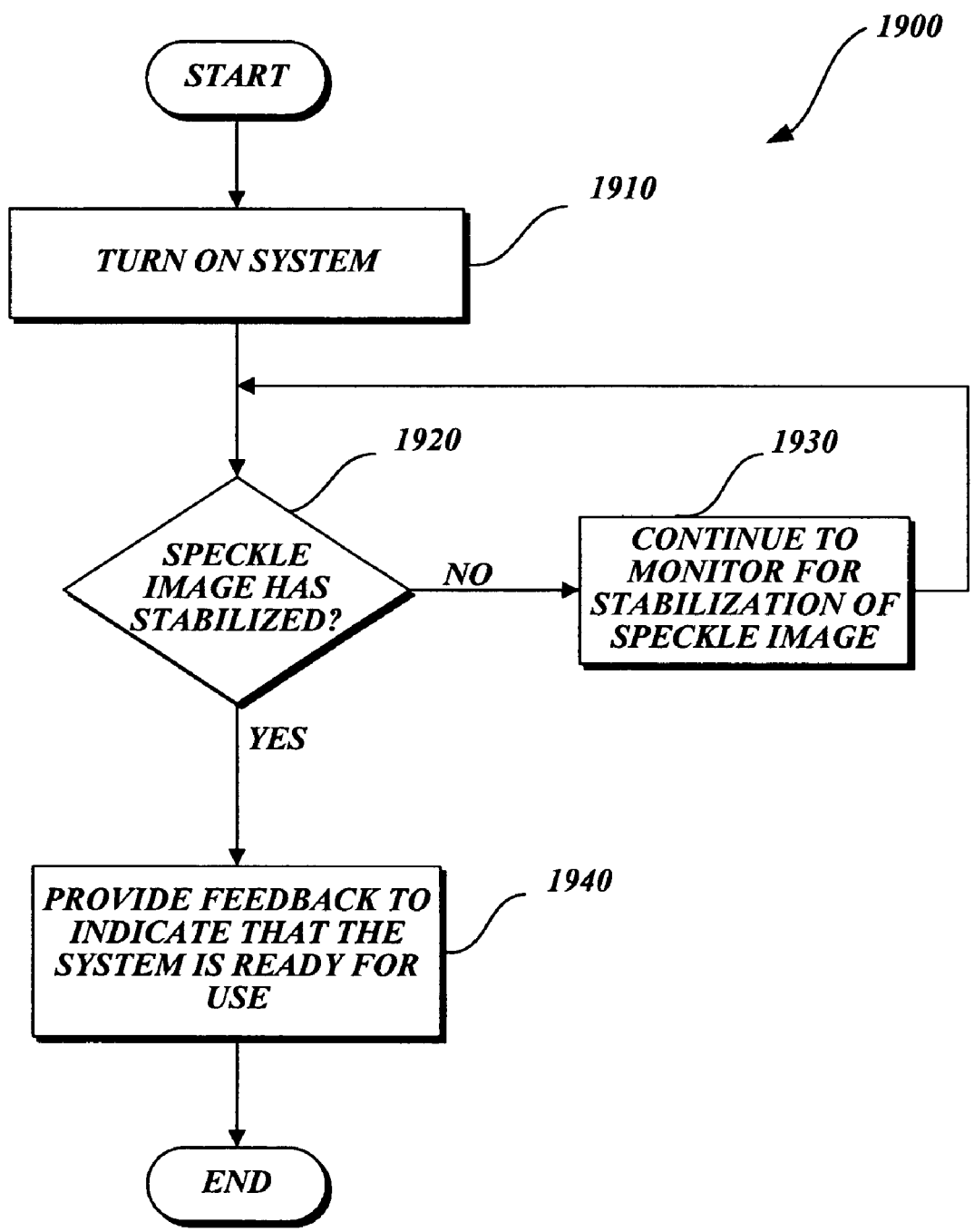
FIG. 19 is a flow diagram illustrative of a routine for providing feedback regarding when a speckle image has stabilized.

FIG. 19 is a flow diagram illustrative of a routine 1900 for providing feedback regarding when a speckle image has stabilized. At a block 1910, the system is turned on. At a decision block 1920, a determination is made as to whether the speckle image has stabilized to a desired degree. If the speckle image has not stabilized, then the routine continues to a block 1930, where it continues to monitor for stabilization of the speckle image, and then returns to block 1920. If at block 1920 the speckle image has stabilized, then the routine continues to a block 1940, where feedback is provided to an operator, or a host system to indicate that the optical displacement system has stabilized to the desired degree and is ready for use. Operator feedback may include, for example, providing an indicator LED on the readhead and turning the LED on when the system is ready for use, or activating an appropriate display element on a computer display or other device communicating with the readhead. Feedback to a host system may be provided by any host-compatible output signal. It should be appreciated that whether or not the speckle image has stabilized may be inferred by monitoring any of various factors. Various factors can be compared to threshold values that are known to be indicative of stable speckle images. As one simple example, it may be determined by experiment that the readhead operation stabilizes under nominal operating conditions after a certain elapsed warm-up time after system turn on. In such a case, that warm-up time may used as a threshold value and the elapsed time after system turn on may be monitored by a system clock, or the like.

Figure 20:
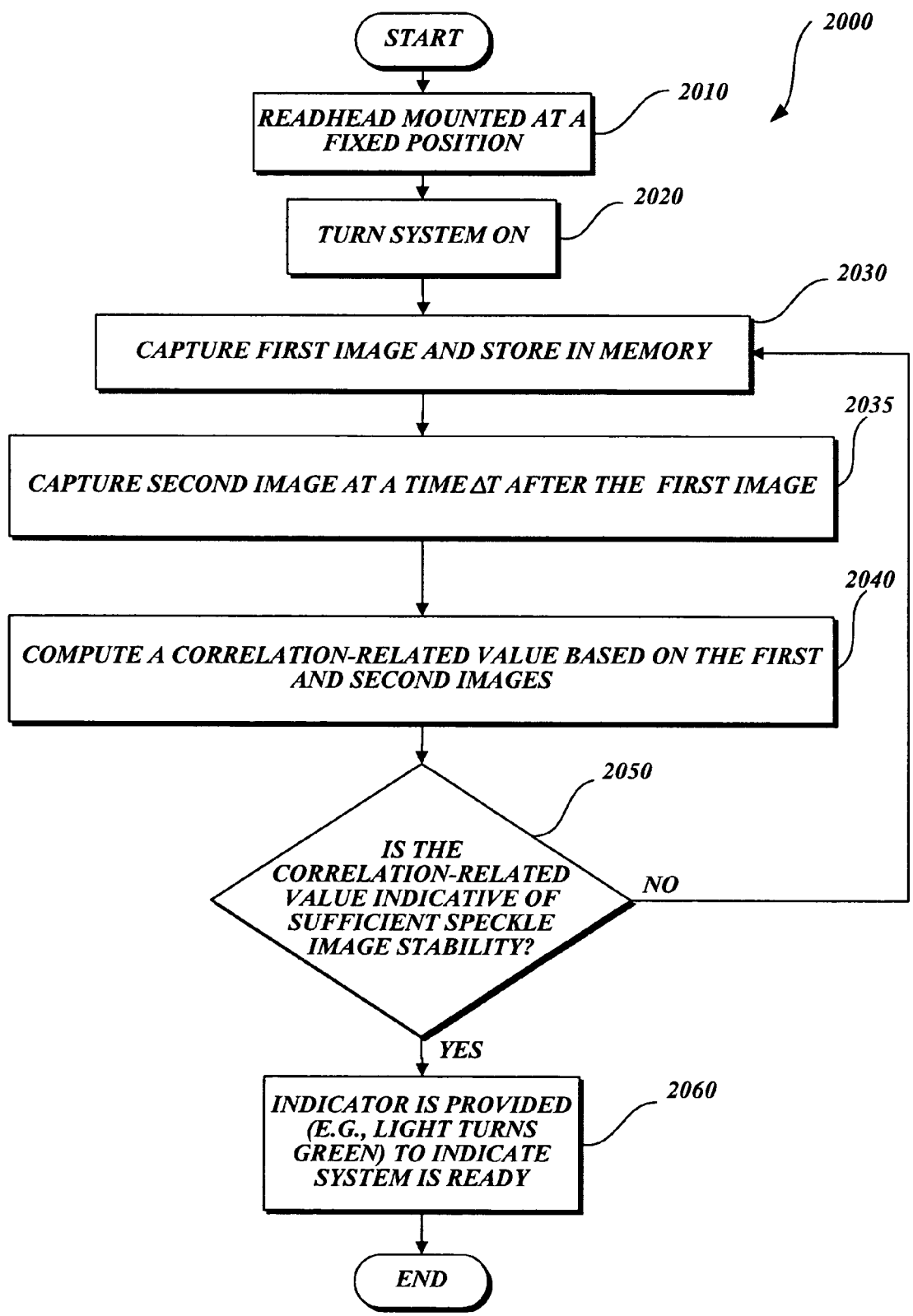
FIG. 20 is a flow diagram illustrative of a routine for providing feedback to a user or control system regarding when a system is ready for use.

FIG. 20 is a flow diagram illustrative of a routine 2000 for providing feedback to a user or a host system regarding when the optical displacement measuring system has stabilized and is ready for use. At a block 2010, the readhead is mounted at a fixed position relative to the optically diffusing surface. At a block 2020, the system is turned on. At a block 2030, the system captures a first image and stores it in memory. At a block 2035, a second image is acquired at a time $\Delta T$ after the first image. At a block 2040, the routine computes a peak correlation value $R_{peak}$ between the first image and the second image, or a correlation quality indicator such as CQ, or the like. At a decision block 2050, a determination is made as to whether the peak correlation value $R_{peak}$, or the correlation quality indicator, is indicative of a sufficient level of speckle image or system stability. For example, this may be achieved by determining whether $R_{peak} > R_O$, or $CQ > CQ_O$ wherein $R_O$ and $CQ_O$ is a threshold correlation value and a threshold correlation quality, respectively, known to correspond to a level of speckle image or system stability that generally provides sufficient displacement measurement accuracy. Alternatively, this may be achieved by determining whether the difference between two successive values for $R_{peak}$, or the difference between two successive values for CQ, has decreased to a level indicative of sufficiently "steady state" operation, such as may occur due to the diminishing of the temperature variation that occurs during the initial system warm-up. If at decision block 2050 the value $R_{peak}$, or a correlation quality indicator, is indicative of insufficient speckle image or system stability, then the routine returns to block 2030, or alternatively, stores the most recent image in memory as the "first image" and returns to block 2035. If at decision block 2050 the value $R_{peak}$ is indicative of sufficient system stability, then the routine continues to block 2060, where an indicator is provided (e.g., a light on the readhead turns on, or a host-compatible output signal is initiated) to indicate that the system is ready for use.

Figure 21:
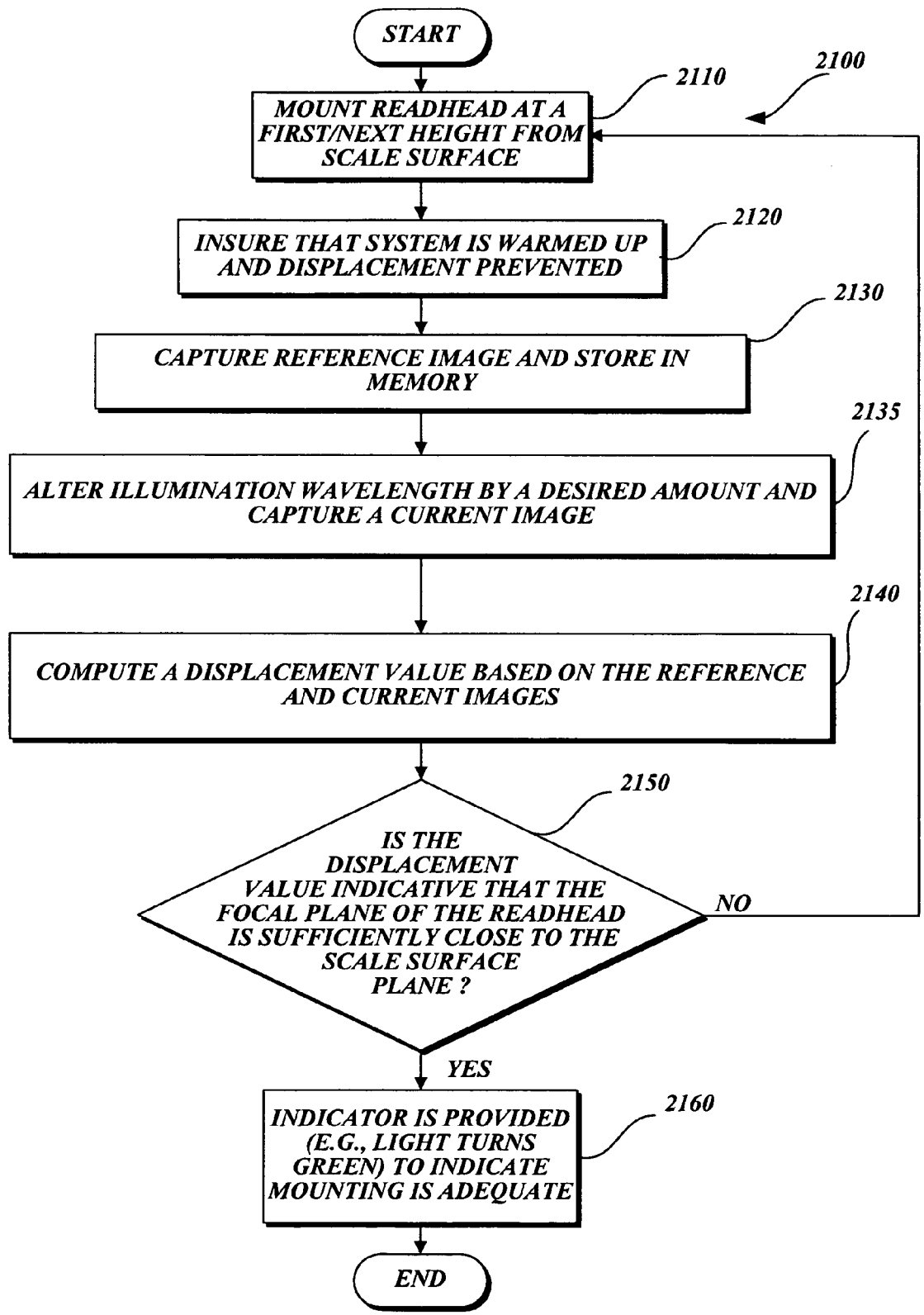
FIG. 21 is a flow diagram illustrative of a routine for providing feedback to a user or control system regarding when a mounting position is adjusted properly for use.

FIG. 21 is a flow diagram illustrative of one exemplary routine 2100 for providing feedback to a user or control system regarding when a mounting position height is adjusted properly or adequately for use. As previously outlined with reference to EQUATION 8 and FIGS. 11 and 13, a mounting position that locates the optically diffusing surface of the scale at the focal plane of the readhead will nominally eliminate measurement errors due to wavelength variations. Such a mounting position may be nominally obtained by the routine shown in FIG. 21. At a block 2110, the readhead is mounted at a first/next height relative to the optically diffusing surface. At a block 2120, it is insured that the system is warmed up to the point of stable, or approximately steady state, operation and that the readhead is held at a fixed position relative to the optically diffusing surface. At a block 2130, the system captures a reference image and stores it in memory. At a block 2135, the wavelength of the illumination from the coherent light source is altered by a desired amount, for example, an amount that will cause an unacceptable displacement error when the mounting position is not adequately adjusted. This may be roughly on the order of a 0.5 nm or 1.0 nm wavelength change for some applications, but this range is exemplary only and not limiting. Then a current image is captured. At a block 2140, the routine computes a displacement value based on the reference and current images. This displacement value is actually a displacement error due to the altered wavelength, since the readhead is held at a fixed position relative to the scale. It should be appreciated that when the readhead is positioned at the proper height relative to the scale surface, that is, when the focal plane of the readhead is sufficiently close to the scale surface plane, this displacement value will be made sufficiently small, or eliminated.

Next, at a decision block 2150, it is determined whether the displacement value determined at the block 2140 is indicative that the focal plane of the readhead is sufficiently close to the scale surface plane. For example, the displacement value may be compared to a sufficiently small threshold value, for example, a threshold value that is chosen with due consideration to the amount that the wavelength is altered between the reference in current images, and that corresponds to an acceptable displacement error when the mounting position is adequately adjusted. For example, this threshold value may be roughly on the order of 100 times the wavelength change that was applied at block 2135, for some applications. However, this threshold value is exemplary only and not limiting. If it is determined that the displacement value is indicative that the focal plane of the readhead is not sufficiently close to the scale surface plane, then the routine returns to block 2110. This would occur, for example, if the displacement value is compared to a threshold value and exceeds the threshold value. In an alternative embodiment, this would occur, for example if the displacement value is compared to a previous displacement value obtained at a different mounting height and is found to be larger than the previous displacement value. It should be appreciated that in such an embodiment, if the current displacement value is less than the previous displacement value, then the mounting adjustment steps should continue in the same direction. Conversely, if the current displacement value is greater than the previous displacement value, then the mounting adjustment direction should be reversed. In this way, the mounting height will converge to an optimum position.

If it is determined at the decision block 2150 that the displacement value is indicative that the focal plane of the readhead is sufficiently close to the scale surface plane, then the routine continues to block 2160, where an indicator is provided (e.g., a light on the readhead turns on, or a host-compatible output signal is initiated) to indicate that the a mounting position height is adjusted properly or adequately for use.

Alternatively to the routine 2110, the mounting position height may the adjusted properly or adequately for use by turning off the coherent light source, illuminating the scale surface with an incoherent light of adequate intensity, and acquiring a conventional image rather than a speckle image using the readhead. A focus-related characteristic may be determined based on the conventional image. The readhead may be iteratively adjusted and a focus-related characteristic iteratively determined. When the focus-related characteristic indicates that the surface is best or adequately focused, the mounting position height is proper. Methods of identifying a well-focused image, for example by contrast measures, are generally known to one skilled in the art of image correlation and are therefore not discussed in detail here. Of course, any other suitable now-known or later-developed method may also be used to establish the proper mounting position height.

It should be appreciated that any now known or later developed semiconductor laser source having a lower wavelength sensitivity to operating temperature than that shown in FIG. 7 will provide an additional measure of accuracy improvement. Any such laser source may be used in conjunction with any of the systems and methods disclosed herein. A VCSEL type laser diode may be used in various embodiments to provide such a source.

It should also be appreciated that although some or all of the accuracy enhancing systems and methods disclosed herein have been individually described, a combination of two or more compatible systems and methods disclosed herein may generally be used to provide a more reliable, robust and/or accurate optical displacement sensor. If the highest levels of reliable resolution and/or accuracy are to be provided, for example for meaningful measurement resolution at the level of tens of nanometers, and/or down to one nanometer or less, such combinations are particularly advantageous.

While the preferred embodiment of the invention has been illustrated and described, it will be appreciated that various changes can be made therein without departing from the spirit and scope of the invention.

The embodiments of the invention in which an exclusive property or privilege is claimed are defined as follows:

1. A speckle-image-correlation optical displacement sensing readhead, the readhead providing speckle pattern images used to determine a relative displacement measurement along at least a first measurement axis relative to a member having a surface that gives rise to speckles when illuminated with coherent radiation, the readhead comprising:
   a coherent light source that emits a light beam that illuminates a portion of the surface to produce a speckle pattern that corresponds to the illuminated portion, the illuminated portion depending on the relative displacement;
   a readhead optical system having a nominal focal plane, the readhead optical system including an image detector positioned along an optical path of the readhead optical system to receive an image of the speckle pattern; and
   at least one stabilizing element, wherein the stabilizing element stabilizes the speckle pattern images used to determine the relative displacement measurement with respect to potential changes in the speckle pattern that might otherwise occur due to causes other than the relative displacement along at least a first measurement axis, the at least one stabilizing element comprising a warm-up period monitoring system that provides a signal when the speckle pattern images used to determine a relative displacement measurement are nominally stable.

2. The readhead of claim 1, wherein the readhead further comprises at least one element used to stabilize a wavelength of the coherent light source, the at least one element comprising at least one of a thermoelectric cooler, and a feedback system that governs operation of the coherent light source such that the wavelength is stabilized.

3. The readhead of claim 2, wherein the readhead comprises the feedback system, and the feedback system comprises a grating positioned at an angle relative to a light path including light from the output beam of the coherent light source such that a nominal operating wavelength of light incident on the grating is directed back to reenter the coherent light source.

4. The readhead of claim 1, wherein when the readhead is held at a fixed position the warm-up period monitoring system is operable to:
  determine and monitor at least one value comprising at least one of a) an elapsed time since the readhead was turned on, b) a peak correlation value based on two successive images, c) a difference between two successive peak correlation values, d) a correlation quality value based on two successive images, and e) a difference between two successive correlation quality values; and
  determine when the speckle pattern images used to determine a relative displacement measurement we nominally stable, based on the determined and monitored at least one value.

5. The readhead of claim 1, wherein the signal comprises at least one of a) a change in state of an indicator light on the readhead and b) an electrical signal output to a host system.

6. The readhead of claim 1, wherein the readhead is configured such that the light beam that illuminates a portion of the surface provides normal-incidence illumination on the surface.

7. The readhead of claim 1, wherein a prescribed nominal mounting position height of the readhead locates the readhead at an operating height above the surface that gives rise to speckles such that there is an air gap between the readhead and the surface that gives rise to speckles, and such that the nominal focal plane nominally coincides with the surface that gives rise to speckles.

8. The readhead of claim 1, wherein the readhead further comprises a mounting position height monitoring system that provides a signal when the readhead is located at a prescribed mounting position height relative to the surface that gives rise to speckles.

9. The readhead of claim 8, wherein the prescribed mounting position height relative to the surface that gives rise to speckles locates the readhead such that there is an air gap between the readhead and the surface that gives rise to speckles, and such that the nominal focal plane nominally coincides with the surface that gives rise to speckles.

10. The readhead of claim 1, wherein the readhead is configured such that when the readhead is held at a fixed displacement position relative to the surface that gives rise to speckles and the warm-up period monitoring system provides the signal, then the readhead is thereafter operable to provide a set of displacement values such that the members of the set of displacement values do not vary by more than +/−50 nanometers relative to the average value of that set of displacement values, the set of displacement values obtained throughout at least a 12 hour operation period beginning no more than 1 hour after initial turn-on of the readhead.

11. The readhead of claim 10, wherein the at least a 12 hour operation period begins no more than 30 minutes after the initial turn-on of the readhead.

12. The readhead of claim 11, wherein the at least a 12 hour operation period begins no more than 10 minutes after the initial turn-on of the readhead.

13. The readhead of claim 10, wherein the members of the set of displacement values do not vary by more than +/−25 nanometers relative to the average value of the set.

14. The readhead of claim 10, wherein the members of the set of displacement values do not vary by more than +/−10 nanometers relative to the average value of the set.

15. A method for operating a speckle-image-correlation optical position transducer readhead, the method comprising:
  (a) providing a readhead usable to measure a relative displacement along at least a first measurement axis relative to a member having an optically diffusing surface, the readhead comprising:
    a coherent light source that emits a light beam that illuminates a portion of the optically diffusing surface, the illuminated portion depending on the relative displacement and producing a scattered light that corresponds to the illuminated portion, and
    a readhead optical system having a nominal focal plane, the readhead optical system including an image detector positioned along an optical path of the readhead optical system to receive the scattered light, wherein the scattered light creates a speckle intensity pattern on the image detector that corresponds to the illuminated portion of the optically diffusing surface, the speckle intensity pattern comprising a plurality of speckles;
  (b) mounting the readhead at a mounting position height above an optically diffusing surface; and
  (c) operating the readhead to provide a speckle intensity pattern in a manner that stabilizes the speckle intensity pattern with respect to potential changes in the speckle intensity pattern that might otherwise occur due to causes other than the relative displacement along at least a first measurement axis, wherein operating the readhead in the manner that stabilizes the speckle intensity pattern comprises monitoring
  the readhead for completion of a system warm-up period and providing an indication when the warm-up is complete.

16. The method of claim 15, wherein operating the readhead in the manner that stabilizes the speckle intensity pattern comprises operating at least one element to stabilize a wavelength of the coherent light source, the at least one element comprising at least one of a thermoelectric cooler, and a feedback system that governs operation of the coherent light source such that the wavelength is stabilized.

17. The method of claim 15, wherein operating the readhead in the manner that stabilizes the speckle intensity pattern comprises operating the readhead at a mounting position height determined such that the nominal focal plane nominally coincides with the optically diffusing surface.

18. The method of claim 16, wherein operating at least one element to stabilize a wavelength of the coherent light source comprises operating the feedback system and operating the feedback system comprises utilizing an external grating, wherein the grating is positioned at an angle relative to the output beam of the coherent light source such that a fraction of the wavelength incident on the grating is fed back to the coherent light source.

19. The method of claim 15, wherein operating the readhead in the manner that stabilizes the speckle intensity pattern comprises mounting the readhead at mounting position height relative to the optically diffusing surface, wherein the mounting position height locates the readhead relative to the optically diffusing surface such that:

the prescribed mounting position height defines an air gap between the readhead and the optically diffusing surface; and the mounting position height locates the nominal focal plane of the readhead proximate to the optically diffusing surface such that under a test condition wherein the readhead is operated at the mounting position height and is held at a fixed position relative to the optically diffusing surface and a wavelength of the coherent light source is varied by 0.5 nm, an apparent relative displacement variation of less than 50 nanometers is observed corresponding to the 0.5 nanometer wavelength variation.

20. The method of claim 15, wherein monitoring the readhead for completion of the system warm-up period and providing an indication when the warm-up is complete comprises the steps of:

fixing the readhead at an operable position relative to the optically diffusing surface;

capturing a first image at a first time and storing it in memory;

capturing a second image at a second time after the first time;

computing a correlation between the first and second images;

determining whether the correlation reaches a threshold value, and if the correlation reaches the threshold value, then providing an indication to one of a user and a host system that the system is ready to measure the relative displacement along at least a first measurement axis, and if the correlation does not reach the threshold value, then repeating the first and second image capture steps, the computing a correlation step, and the determining step.

21. The method of claim 20, wherein providing the indication comprises activating a light on the readhead.

22. The method of claim 15, wherein operating the readhead in the manner that stabilizes the speckle intensity pattern further comprises arranging the readhead such that the light beam that illuminates the portion of the optically diffusing surface provides normal-incidence illumination on the optically diffusing surface.

23. The readhead of claim 4, wherein when the warm-up period monitoring system is operable to determine and monitor at least one value comprising at least one of b) and c).

24. The readhead of claim 4, wherein when the warm-up period monitoring system is operable to determine and monitor at least one value comprising at least one of d) and e).

25. The readhead of claim 1, wherein the readhead has a prescribed mounting position height and the prescribed mounting position height locates the readhead relative to the surface that gives rise to speckles such that:

the prescribed mounting position height defines an air gap between the readhead and the surface that gives rise to speckles; and the prescribed mounting position height locates the nominal focal plane of the readhead proximate to the surface that gives rise to speckles and such that under a test condition wherein the readhead is mounted at the prescribed mounting position height and is held at a fixed position relative to the surface that gives rise to speckles and a wavelength of the coherent light source is varied by 0.5 nm, an apparent relative displacement variation of less than 50 nanometers is observed corresponding to the 0.5 nanometer wavelength variation.

26. The readhead of claim 25, wherein the readhead further comprises a mounting position height monitoring system that provides a signal when the readhead is located at the prescribed nominal mounting position height relative to the surface that gives rise to speckles.

27. The readhead of claim 25, wherein the prescribed nominal mounting position height locates the readhead relative to the surface that gives rise to speckles such that the surface that gives rise to speckles is positioned beyond the nominal focal plane of the readhead and not more than 0.5 millimeters from the nominal focal plane of the readhead.

* * * * *

UNITED STATES PATENT AND TRADEMARK OFFICE
CERTIFICATE OF CORRECTION

PATENT NO. : 7,295,324 B2  Page 1 of 1
APPLICATION NO. : 10/890919
DATED : November 13, 2007
INVENTOR(S) : B.K. Jones et al.

It is certified that error appears in the above-identified patent and that said Letters Patent is hereby corrected as shown below:

| COLUMN | LINE | ERROR |
|---|---|---|
| 21 (Claim 4, line 13) | 22 | "we" should read --are-- |
| 22 (Claim 15, lines 31-32) | 38 | after "monitoring", there should be no paragraph break before "the readhead" |

Signed and Sealed this

Twenty-second Day of July, 2008

JON W. DUDAS
*Director of the United States Patent and Trademark Office*